US010914247B2

(12) United States Patent
Inoue et al.

(10) Patent No.: US 10,914,247 B2
(45) Date of Patent: Feb. 9, 2021

(54) BOOSTED ENGINE WITH BOOST CONTROLLER AND CONTROL UNIT

(71) Applicant: Mazda Motor Corporation, Hiroshima (JP)

(72) Inventors: Atsushi Inoue, Aki-gun (JP); Keiji Araki, Hatsukaichi (JP)

(73) Assignee: Mazda Motor Corporation, Hiroshima (JP)

( * ) Notice: Subject to any disclaimer, the term of this patent is extended or adjusted under 35 U.S.C. 154(b) by 64 days.

(21) Appl. No.: 16/110,119

(22) Filed: Aug. 23, 2018

(65) Prior Publication Data
US 2019/0093575 A1 Mar. 28, 2019

(30) Foreign Application Priority Data
Sep. 27, 2017 (JP) .................... 2017-185750

(51) Int. Cl.
*F02D 41/00* (2006.01)
*F02D 35/02* (2006.01)
(Continued)

(52) U.S. Cl.
CPC .......... *F02D 41/0007* (2013.01); *F02B 23/10* (2013.01); *F02B 37/16* (2013.01);
(Continued)

(58) Field of Classification Search
CPC ............. F02D 41/0007; F02D 41/3041; F02D 35/026; F02D 41/401; F02D 41/0052;
(Continued)

(56) References Cited

U.S. PATENT DOCUMENTS 6,293,246 B1 * 9/2001 Tanahashi ................ F01L 1/34
123/305
6,968,825 B2 * 11/2005 Hitomi .................... F01L 1/053
123/406.11
(Continued)

FOREIGN PATENT DOCUMENTS

JP 4082292 B2 4/2008
JP 2008184968 A 8/2008
(Continued)

*Primary Examiner* — David Hamaoui
(74) *Attorney, Agent, or Firm* — Alleman Hall Creasman & Tuttle LLP

(57) ABSTRACT

A boosted engine is provided, which includes an engine body formed with a combustion chamber, a spark plug, a fuel injection valve, a booster, a boost controller, and a control unit including an operating range determining module and a compression end temperature estimating module. In a high load range, the fuel injection valve and the spark plug are controlled so that a mixture gas inside the combustion chamber starts combustion through flame propagation by ignition of the spark plug, and unburned mixture gas then combusts by compression ignition, and the boost controller is controlled to bring the booster into a boosting state. When a gas temperature inside the combustion chamber exceeds a given temperature at CTDC, the fuel injection valve is controlled so that a fuel injection end timing occurs on a compression stroke, and the spark plug is controlled so that the mixture gas is ignited after CTDC.

7 Claims, 17 Drawing Sheets

(51) Int. Cl.
*F02B 37/16* (2006.01)
*F02D 41/40* (2006.01)
*F02D 41/30* (2006.01)
*F02M 26/22* (2016.01)
*F02B 23/10* (2006.01)
*F02P 5/04* (2006.01)
*F02D 37/02* (2006.01)
*F02P 5/152* (2006.01)
*F02M 26/00* (2016.01)
*F02D 13/02* (2006.01)

(52) U.S. Cl.
CPC .......... *F02B 37/162* (2019.05); *F02D 35/026* (2013.01); *F02D 41/0052* (2013.01); *F02D 41/3041* (2013.01); *F02D 41/401* (2013.01); *F02M 26/22* (2016.02); *F02P 5/045* (2013.01); *F02B 2023/108* (2013.01); *F02D 13/023* (2013.01); *F02D 37/02* (2013.01); *F02D 41/0057* (2013.01); *F02D 41/0072* (2013.01); *F02D 41/402* (2013.01); *F02D 2200/022* (2013.01); *F02D 2200/10* (2013.01); *F02M 2026/004* (2016.02); *F02P 5/152* (2013.01)

(58) Field of Classification Search
CPC .. F02D 41/0072; F02D 37/02; F02D 2200/10; F02D 2200/022; F02D 41/402; F02D 41/0057; F02D 13/023; F02D 41/3017; F02D 41/0077; F02D 35/025; F02D 15/00; F02D 13/0276; F02D 13/0223; F02B 37/162; F02B 37/16; F02B 23/10; F02B 2023/108; F02P 5/045; F02P 5/152; F02P 5/1502; F02M 26/22; F02M 2026/004
See application file for complete search history.

(56) References Cited

U.S. PATENT DOCUMENTS

| | | | | |
|---|---|---|---|---|
| 7,363,911 | B2* | 4/2008 | Brehob | F02D 41/3035 123/406.47 |
| 7,926,272 | B2* | 4/2011 | Takemoto | F02M 26/05 123/568.12 |
| 9,328,688 | B2* | 5/2016 | Hitomi | F02D 41/3035 |
| 2015/0053171 | A1* | 2/2015 | Sasaki | F02B 11/00 123/27 R |

FOREIGN PATENT DOCUMENTS

| | | |
|---|---|---|
| JP | 2010236477 A | 10/2010 |
| JP | 2012246777 A | 12/2012 |
| JP | 5447435 B2 | 3/2014 |

\* cited by examiner

BOOSTED ENGINE WITH BOOST CONTROLLER AND CONTROL UNIT

TECHNICAL FIELD

The present disclosure relates to a boosted engine.

BACKGROUND OF THE DISCLOSURE

JP4082292B discloses an engine in which a mixture gas inside a combustion chamber is combusted by compression ignition within a given operating range of the engine in which an engine load and an engine speed are low. In this engine, the mixture gas combusts by spark-ignition within an operating range in which the engine load is higher than the given operating range and an operating range in which the engine speed is higher than the given operating range. Further in this engine, also within the given operating range, a spark plug performs the spark-ignition near a top dead center of compression stroke to stimulate compression ignition of the mixture gas.

JP5447435B discloses an engine in which the mixture gas inside a combustion chamber is combusted by compression ignition within a high load range of the engine. In this engine, within an operating range where an engine load is high and an engine speed is high, a fuel injection is performed with a small amount of fuel between a first-stage injection in which the mixture gas for compression ignition combustion is formed and a second-stage injection, in order to assist the ignition. The spark plug ignites the rich mixture gas to form a flame, which causes the mixture gas formed by the first-stage injection to ignite by compression, and then the mixture gas formed by the second-stage injection performed simultaneously to the compression ignition also ignites by compression.

Incidentally, the engine which performs the conventional combustion caused by compression ignition incurs a relatively loud combustion noise. For example, if this combustion is to be performed while the engine is operating within a high load range including a full load, the combustion noise may exceed an allowable value.

SUMMARY OF THE DISCLOSURE

The present disclosure aims to perform combustion accompanying compression ignition while lowering combustion noise below the allowable value.

The present inventors considered a combustion mode in which SI (Spark Ignition) combustion and CI (Compression Ignition) combustion are combined. The SI combustion is combustion accompanying flame propagation which starts by forcibly igniting the mixture gas inside a combustion chamber. The CI combustion is combustion which starts by the mixture gas inside the combustion chamber self-igniting by being compressed. In the combustion mode combining the SI combustion and the CI combustion, the mixture gas inside the combustion chamber is forcibly ignited to start its combustion through flame propagation, and heat generated by this SI combustion and pressure increase thereby cause combustion of unburned mixture gas inside the combustion chamber by compression ignition. Hereinafter, this combustion mode is referred to as "SPCCI (SPark Controlled Compression Ignition) combustion."

In the combustion caused by compression ignition, the timing of the compression ignition changes greatly if the temperature inside the combustion chamber varies before the compression starts. In this regard, the variation in the temperature inside the combustion chamber before the compression starts can be reduced by adjusting the heat generation amount in the SI combustion. By controlling the ignition timing to adjust the start timing of the SI combustion according to the temperature inside the combustion chamber before the compression starts, the timing of compression ignition is controlled. That is, the SPCCI combustion controls the CI combustion with the SI combustion.

In the SPCCI combustion, the SI combustion through flame propagation causes a more gradual pressure increase compared to the CI combustion, thus lowering combustion noise. Further, the CI combustion shortens the combustion period compared to the SI combustion, which is advantageous in improving fuel efficiency.

In a case where a geometric compression ratio of the engine which performs the SPCCI combustion is set high, such as 14:1 or above so as to improve thermal efficiency, when an engine load is high, a fuel injection amount increases and a temperature inside the combustion chamber rises, and thus a compression end temperature (i.e., a temperature inside the combustion chamber when a piston reaches a top dead center of compression stroke (CTDC)) rises excessively. Further, when intake air is boosted according to the fuel injection amount increase, the compression end temperature and a compression end pressure (pressure inside the combustion chamber when the piston reaches CTDC) rises even more. As a result, the CI combustion may start while the SI combustion is barely performed in the SPCCI combustion, increasing combustion noise.

Therefore, with the art disclosed here, when the engine load is high, the ignition timing of the SPCCI combustion is retarded to after CTDC.

According to one aspect of the present disclosure, a boosted engine is provided, which includes an engine body formed with a combustion chamber, the engine body having a geometric compression ratio set between 14:1 and 30:1, a spark plug disposed in the combustion chamber, a fuel injection valve disposed to be oriented into the combustion chamber and configured to inject fuel at least containing gasoline, a booster disposed in an intake passage connected to the combustion chamber, a boost controller configured to switch a state of the booster between a boosting state where gas introduced into the combustion chamber is boosted and a non-boosting state where the gas is not boosted, and a control unit connected to the spark plug, the fuel injection valve, and the boost controller and configured to output a control signal to the spark plug, the fuel injection valve, and the boost controller, respectively. The control unit includes a processor configured to execute an operating range determining module to determine an operating range of the engine, and a compression end temperature estimating module to determine whether a temperature of the gas inside the combustion chamber exceeds a given temperature at a top dead center of compression stroke.

When the operating range determining module determines that an engine load is in a high load range higher than a given load, the control signals are outputted to the fuel injection valve and the spark plug so that a mixture gas formed inside the combustion chamber starts combustion through flame propagation by the ignition of the spark plug, and unburned mixture gas inside the combustion chamber then combusts by compression ignition, and the control signal is outputted to the boost controller to bring the booster into the boosting state. When the compression end temperature estimating module estimates that the gas temperature inside the combustion chamber exceeds the given temperature at the top dead center, the control signal is outputted to the fuel injection valve so that an injection end timing of the fuel occurs on the compression stroke, and the control signal is outputted to the spark plug so that the mixture gas inside the combustion chamber is ignited after the top dead center.

Here, the "engine" may be a four-stroke engine which is operated by the combustion chamber repeating intake stroke, compression stroke, expansion stroke and exhaust stroke. The "engine load is higher than the given load" may mean that the engine body is operating within the so-called high load range. The "given load" may be a load with which, for example, combustion pressure exceeds 900 kPa. When the fuel is injected "so that the injection end timing of the fuel occurs on the compression stroke, an injection start timing of the fuel includes any timing. The fuel may be injected by being split into a plurality of injections. In this case, it may be said that the injection end timing of the last fuel injection occurs on the compression stroke.

According to this configuration, when the engine load is higher than the given load, after the mixture gas starts the combustion through the flame propagation by the ignition of the spark plug, the unburned mixture gas combusts by the compression ignition. That is, the engine body performs the SPCCI combustion.

The fuel injection valve injects the fuel so that the injection end timing of the fuel becomes on the compression stroke. Since the fuel is injected into the combustion chamber at a timing near the top dead center, the compression end temperature is lowered by the latent heat of vaporization of the fuel.

Further, when the engine load is higher than the given load, the spark plug ignites the mixture gas inside the combustion chamber after the top dead center. Since the SI combustion starts on the expansion stroke, in the SPCCI combustion, the CI combustion caused by the compression ignition is started after the SI combustion is sufficiently performed. Thus, combustion noise is prevented from increasing.

In this case, the CI combustion is performed on the expansion stroke, however, since a period of combustion of the CI combustion is made relatively short even on the expansion stroke, the center of gravity of combustion of the SPCCI combustion is prevented from being significantly far from the top dead center.

For example, if the ignition timing of the SI combustion, not of the SPCCI combustion, is retarded to the expansion stroke, the combustion period of the SI combustion during the expansion stroke becomes long, and the center of gravity of combustion of the SI combustion is significantly far from the top dead center. On the other hand, if the ignition timing of the SPCCI combustion is retarded to the expansion stroke, the center of gravity of combustion of the SPCCI combustion is not to be significantly far from the top dead center, as described above. That is, when the engine load is high, by retarding the ignition timing of the SPCCI combustion to after the top dead center, combustion noise is reduced while preventing thermal efficiency of the engine from degrading.

The engine may have an exhaust gas recirculation (EGR) passage connecting an exhaust passage to the intake passage. The intake passage and the exhaust passage may be connected to the combustion chamber. The EGR passage may be provided with an EGR valve configured to adjust a flow rate of EGR gas flowing inside the EGR passage in response to receiving a control signal from the control unit. When the operating range determining module determines that the engine load is in the high load range, the control unit may output the control signal to the EGR valve so that the EGR gas is recirculated to the intake passage.

According to this configuration, when the engine load is high, the EGR gas (inactive gas) is recirculated to the intake passage by an external EGR system to be introduced into the combustion chamber. This causes the SI combustion in the SPCCI combustion to be slower, which is advantageous in reducing combustion noise.

Here if the EGR gas is introduced into the combustion chamber, in a naturally aspirated state, oxygen inside the combustion chamber is reduced according to the ratio of the EGR gas to total gas inside the combustion chamber. In this regard, in this configuration, since the booster boosts gas to be introduced into the combustion chamber when the engine load is high, both fresh air and EGR gas are sufficiently introduced into the combustion chamber.

The EGR passage may connect a downstream side of a catalyst device disposed in the exhaust passage to an upstream side of the booster of the intake passage. When the operating range determining module determines that the engine load is in the high load range, the control unit may output the control signal to the EGR valve so that a ratio of an EGR gas mass with respect to an entire gas mass inside the combustion chamber becomes 20% or above.

Since the EGR passage connects the downstream of the catalyst device and the upstream of the booster, the external EGR system with this configuration constitute the so-called low-pressure EGR system. The EGR gas introduced into the combustion chamber by the low-pressure EGR system is decreased in its temperature compared to that by a high-pressure EGR system (i.e., the EGR system in which the EGR passage connects the upstream of the catalyst device and the downstream of the booster). When the ratio of the EGR gas mass with respect to the entire gas mass inside the combustion chamber is becomes 20% or above and a comparatively large amount of EGR gas is introduced into the combustion chamber, the temperature inside the combustion chamber is prevented from being high. This causes the SI combustion in the SPCCI combustion to be slower, which is advantageous in reducing combustion noise.

Note that although the fuel efficiency of the engine improves when the EGR ratio is set to 20% or above, according to the consideration by the present inventors, once the EGR ratio exceeds 35%, it becomes more difficult for a flame to propagate and the stability of the SI combustion in the SPCCI combustion drops sharply. Thus, the upper limit of the EGR ratio may be set to, for example, 35%. In this manner, fuel efficiency is suitably improved.

The EGR passage may be provided with an EGR cooler configured to cool the EGR gas.

By introducing the EGR gas cooled by the EGR cooler into the combustion chamber, the temperature inside the combustion chamber is prevented from being excessively high. The SPCCI combustion is suitably performed, and fuel efficiency of the engine improves while reducing combustion noise.

When the operating range determining module determines that the engine load is in the high load range, the engine body may set an effective compression ratio to 80% or above of the geometric compression ratio.

When the engine load is higher than the given load, the effective compression ratio is set to 80% or above of the geometric compression ratio. That is, the effective compression ratio of the engine is maintained at a comparatively high ratio.

The engine body may include an intake valve close timing adjusting mechanism configured to adjust a close timing of an intake valve. When the operating range determining module determines that the engine load is in the high load range, the control unit may output a control signal to the intake valve close timing adjusting mechanism to set the close timing of the intake valve in which the effective compression ratio becomes 80% or above of the geometric compression ratio.

The booster boosts gas to be introduced into the combustion chamber when the engine load is higher than the given load. Thus, when the engine load is high, it is possible to introduce sufficient fresh air into the combustion chamber. On the other hand, since the effective compression ratio is high and the boosting is performed when the engine load is higher than the given load, the compression end temperature rises.

A bypass passage communicating an upstream side of the booster to a downstream side thereof to bypass the booster may be provided in the intake passage, the bypass passage provided with a bypass valve configured to adjust the flow rate of the gas flowing through the bypass passage. A boost controlling module may output a control signal to the bypass valve to close so as to enter the boosting state of the gas to be introduced into the combustion chamber, and the boost controlling module may output the control signal to the bypass valve to open so as to enter the non-boosting state of the gas to be introduced into the combustion chamber.

According to another aspect of the present disclosure, a boosted engine is provided, which includes an engine body formed with a combustion chamber, the engine body having a geometric compression ratio set between 14:1 and 30:1, a spark plug disposed in the combustion chamber, a fuel injection valve disposed to be oriented into the combustion chamber and configured to inject fuel at least containing gasoline, a booster disposed in an intake passage connected to the combustion chamber, and a control unit connected to the spark plug and the fuel injection valve and configured to output a control signal to the spark plug and the fuel injection valve, respectively. The control unit includes a processor configured to execute a combustion mode selecting module to select one of a first combustion mode in which SI combustion where a mixture gas formed in the combustion chamber combusts through flame propagation starts and CI combustion where unburned mixture gas combusts by compression ignition is then performed, and a second combustion mode in which only the SI combustion is performed by the flame propagation, and a compression end temperature estimating module to determine whether a temperature of gas inside the combustion chamber exceeds a given temperature at a top dead center of compression stroke. When the combustion mode selecting module selects the first combustion mode, the control signals are outputted to the fuel injection valve and the spark plug so that the mixture gas formed inside the combustion chamber starts combustion through flame propagation by the ignition of the spark plug, and unburned mixture gas inside the combustion chamber then combusts by compression ignition. When the combustion mode selecting module selects the second combustion mode, the control signals are outputted to the fuel injection valve and the spark plug so that the mixture gas formed inside the combustion chamber starts combustion through flame propagation by the ignition of the spark plug and the combustion ends still having been caused by the flame propagation. When the combustion mode selecting module selects the first combustion mode and the compression end temperature estimating module estimates that the gas temperature inside the combustion chamber exceeds the given temperature at the top dead center, the control signal is outputted to the fuel injection valve so that an injection end timing of the fuel is on the compression stroke, and the control signal is outputted to the spark plug so that the mixture gas inside the combustion chamber is ignited after the top dead center.

According to this configuration, when the compression end temperature exceeds the given temperature, by igniting the mixture gas after the top dead center as described above, combustion noise of the SPCCI combustion is prevented from increasing and fuel efficiency of the engine is avoided from being degraded.

The processor may be further configured to execute an operating range determining module to determine an operating range of the engine. When the operating range determining module determines that an engine load is in a high load range above a given load, the control signal may be outputted to the fuel injection valve to perform a first injection on intake stroke and a second injection on the compression stroke. When the compression end temperature estimating module estimates that a temperature of gas inside the combustion chamber exceeds the given temperature at the top dead center, the control signal may be outputted to the fuel injection valve to reduce an injection amount of the first injection and increase an injection amount of the second injection compared to when the gas temperature inside the combustion chamber is lower than the given temperature at the top dead center.

By performing the first injection on the intake stroke, a homogeneous or substantially homogeneous mixture gas is formed in the combustion chamber. By performing the second injection on the compression stroke, the temperature inside the combustion chamber is reduced by the latent heat of vaporization of the fuel before the top dead center on the compression stroke, and thus, the compression end temperature is avoided from being excessively high.

When the compression end temperature exceeds the given temperature, the injection amount of the first injection is reduced, which prevents a chemical reaction of the mixture gas from progressing excessively. Further, the injection amount of the second injection is increased by the reduction amount of the first injection, which increases the lowering amount of the temperature by the latent heat of vaporization before the top dead center. As the result, combustion noise of the SPCCI combustion is prevented from increasing.

When the compression end temperature estimating module estimates that the gas temperature inside the combustion chamber exceeds the given temperature at the top dead center, the control unit may advance a start timing of the second injection compared to when the gas temperature is estimated to be below the given temperature.

That is, the end timing of the second injection is not retarded although the injection amount of the second injection is increased on the compression stroke, the time from the injection end to the ignition is secured long. Since a vaporization time of the fuel is secured sufficiently, an increase of unburned components is avoided and soot generation is reduced.

DETAILED DESCRIPTION OF THE DISCLOSURE

Figure 1:
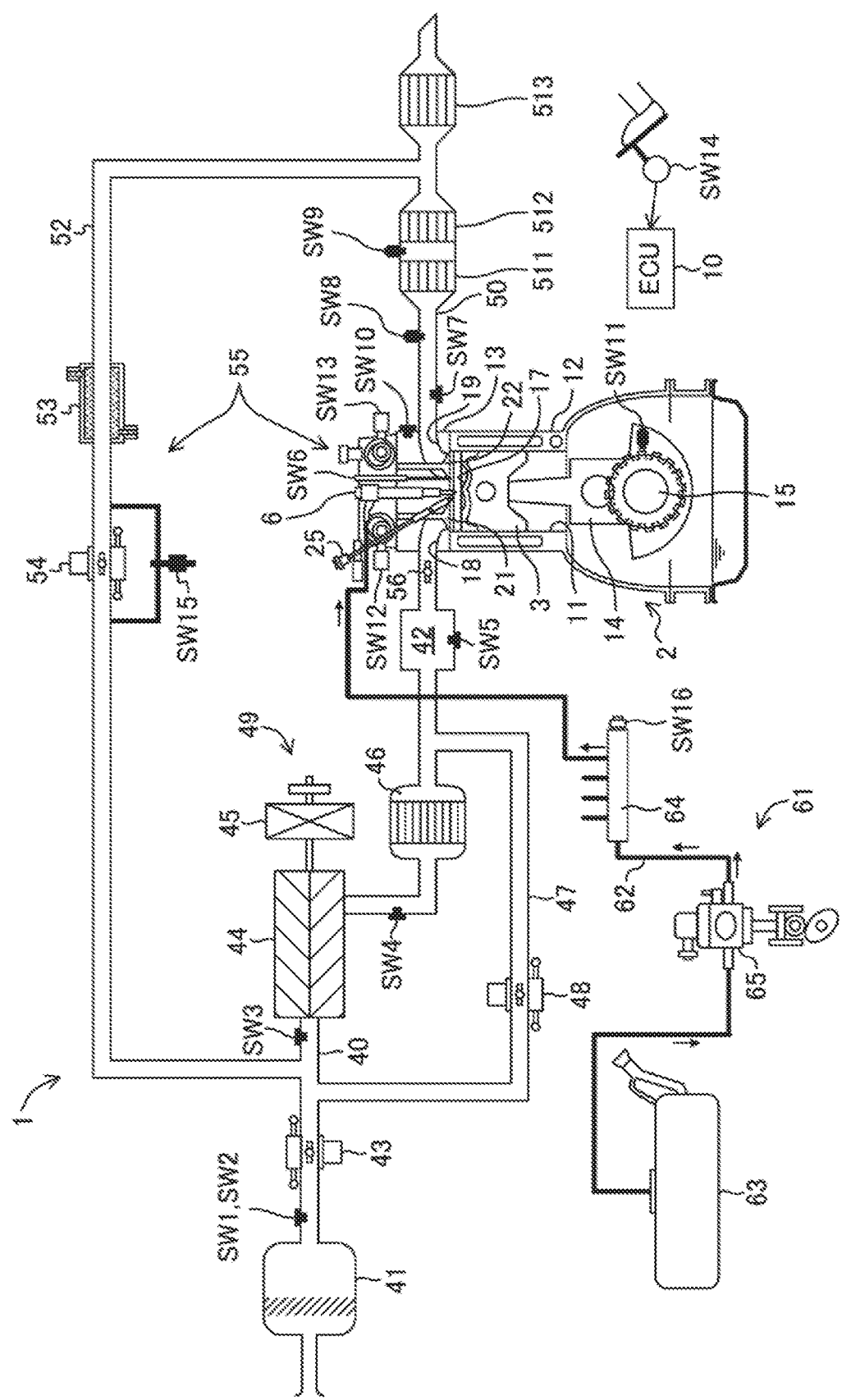
FIG. 1 is a diagram illustrating a configuration of an engine.
Figure 2:
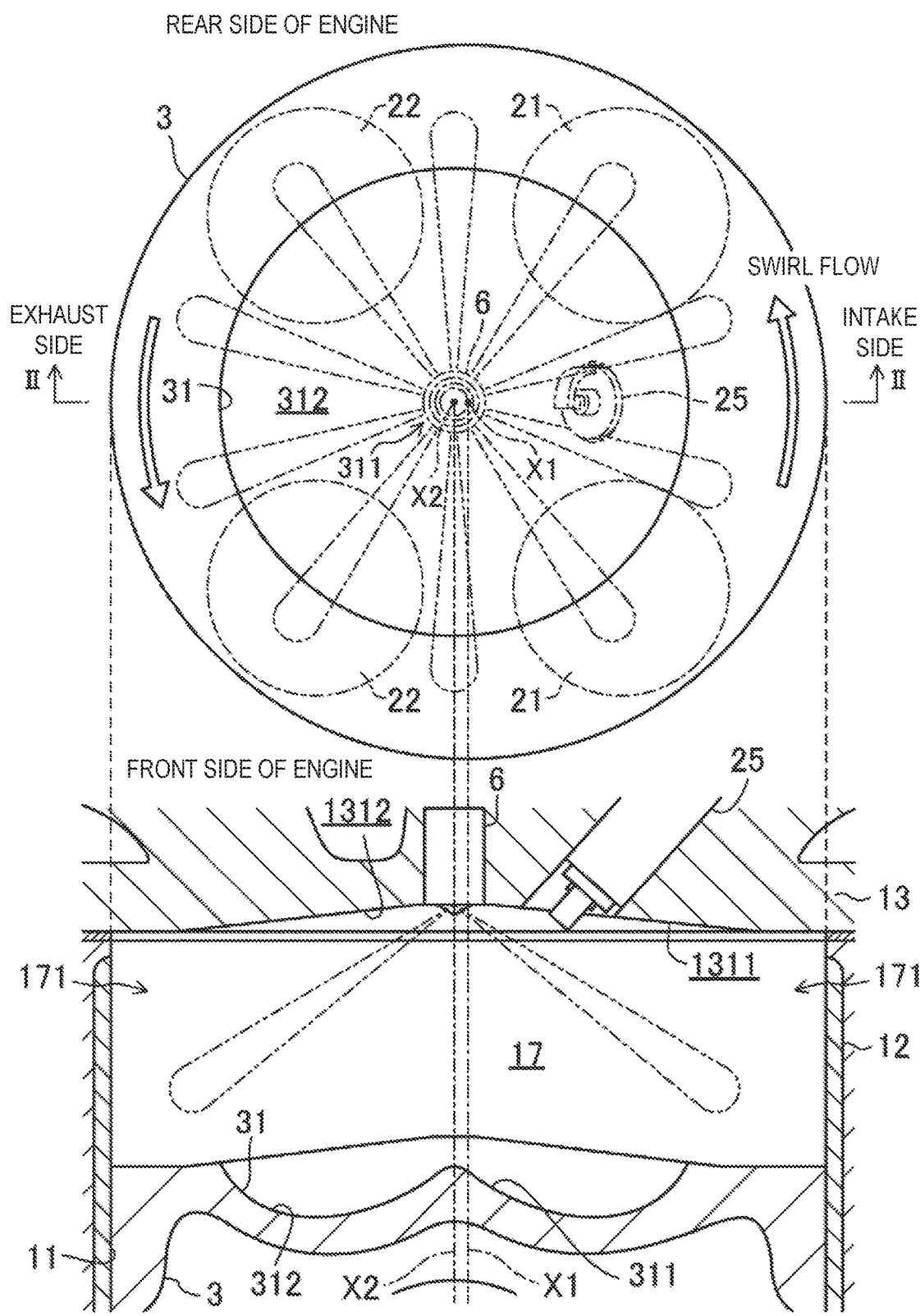
FIG. 2 is a view illustrating a structure of a combustion chamber.
Figure 3:
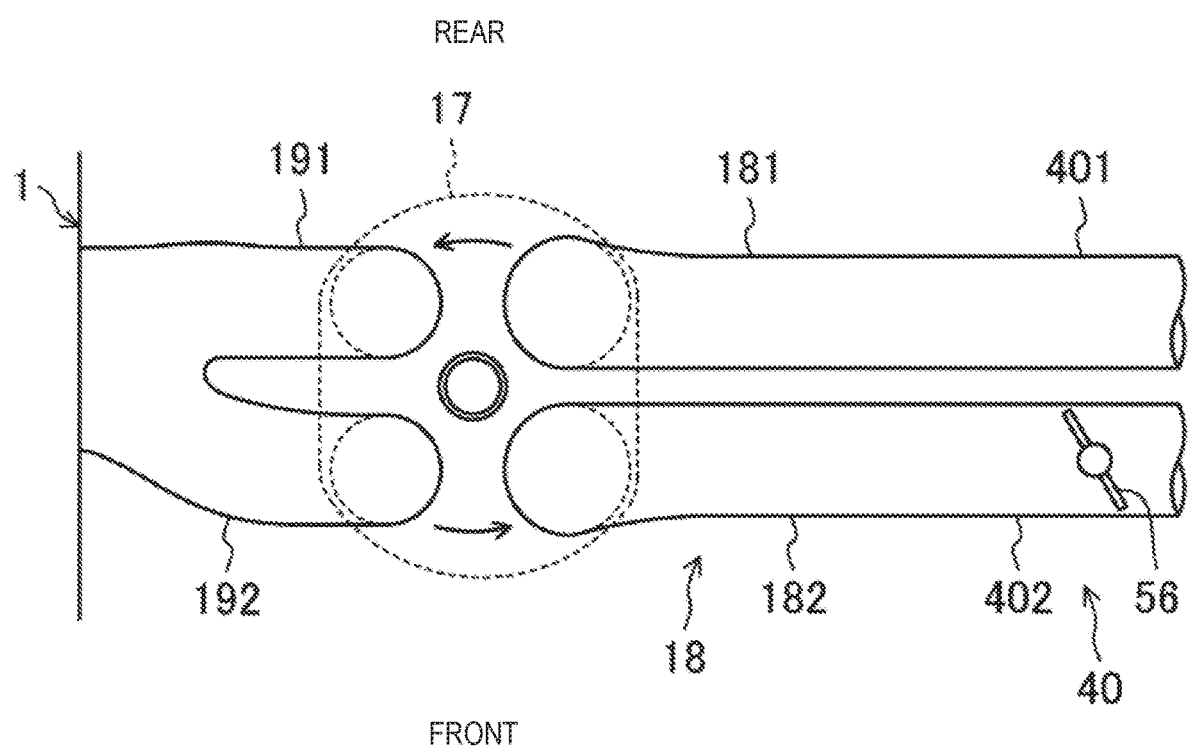
FIG. 3 is a plan view illustrating structures of the combustion chamber and an intake system.
Figure 4:
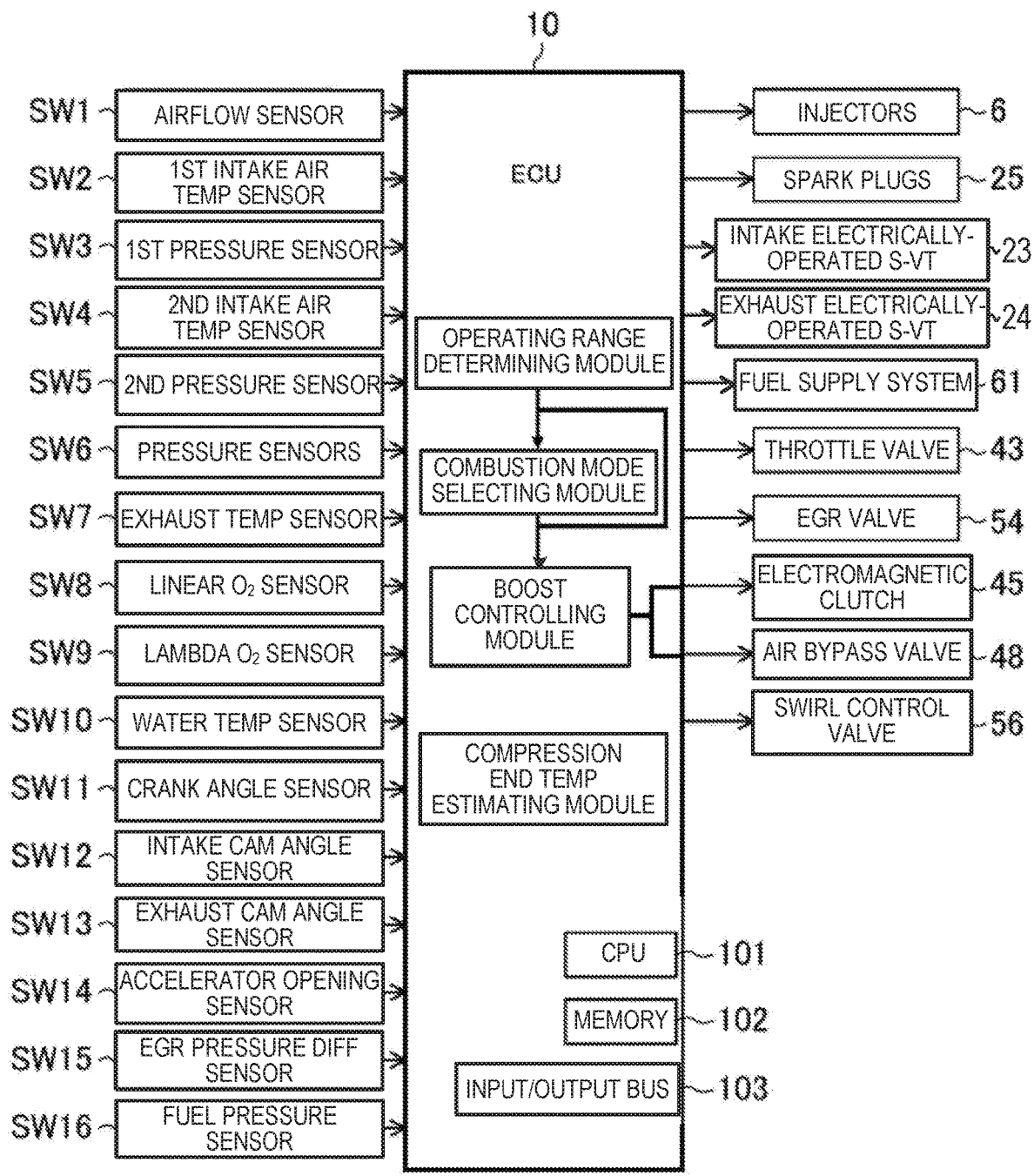
FIG. 4 is a block diagram illustrating a configuration of a control device for the engine.

Hereinafter, one embodiment of a boosted engine is described in detail with reference to the accompanying drawings. FIG. 1 is a diagram illustrating a configuration of an engine 1. FIG. 2 is a view illustrating a structure of a combustion chamber 17, in which the upper part is a plan view of the combustion chamber 17 and the lower part is a cross-sectional view taken in a line II-II. FIG. 3 is a plan view illustrating structures of the combustion chamber 17 and an intake system. FIG. 4 is a block diagram illustrating a configuration of the control device for the engine. Note that in FIG. 1, an intake side is on the left side and an exhaust side is on the right side of the drawing sheet. Further in FIGS. 2 and 3, the intake side is on the right side and the exhaust side is on the left side of the drawing sheets.

The engine 1 is a four-stroke engine which is operated by the combustion chamber 17 repeating intake stroke, compression stroke, expansion stroke, and exhaust stroke. The engine 1 is mounted on a four-wheel automobile. The automobile travels by the operation of the engine 1. Fuel of the engine 1 is gasoline in this embodiment. The gasoline may contain bioethanol, etc. The fuel of the engine 1 may be any kind of fuel as long as it is liquid fuel containing at least gasoline.

<Engine Configuration>

The engine 1 is a multi-cylinder engine. As illustrated in FIG. 1, the engine 1 includes an engine body 2 having the combustion chamber 17. The engine body 2 includes a cylinder block 12 and a cylinder head 13 placed on the cylinder block 12. The cylinder block 12 is formed therein with a plurality of cylinders 11. In FIGS. 1 and 2, only one cylinder 11 is illustrated.

A piston 3 is reciprocatably inserted into each cylinder 11. The piston 3 is coupled to a crankshaft 15 via a connecting rod 14. The piston 3 defines the combustion chamber 17 together with the cylinder 11 and the cylinder head 13. Here, the definition of "combustion chamber" is not limited to a space formed when the piston 3 is at a top dead center on compression stroke (CTDC) but may be broad. That is, "combustion chamber" may mean any space formed by the piston 3, the cylinder 11 and the cylinder head 13 regardless of the position of the piston 3.

As illustrated in the lower part of FIG. 2, a lower surface of the cylinder head 13, that is, a ceiling surface of the combustion chamber 17, is formed by an inclined surface 1311 and an inclined surface 1312. The inclined surface 1311 inclines upwardly toward an injection axis X2 (an axis passing through the center of injection of an injector 6 described later) from the intake side. On the other hand, the inclined surface 1312 inclines upwardly toward the injection axis X2 from the exhaust side. The ceiling surface of the combustion chamber 17 has a so-called pent-roof shape.

An upper surface of the piston 3 bulges toward the ceiling surface of the combustion chamber 17. The piston 3 is dented in its upper surface to form a cavity 31. The cavity 31 is arranged opposing to the injector 6. The center of the cavity 31 is offset from a center axis X1 of the cylinder 11 to the exhaust side, and coincides with the injection axis X2 of the injector 6.

The cavity 31 has a convex section 311. The convex section 311 is formed on the injection axis X2 of the injector 6. The convex section 311 has a substantially conical shape and extends upwardly toward the ceiling surface of the combustion chamber 17 from the bottom of the cavity 31. The cavity 31 has a symmetric shape with respect to the injection axis X2 of the injector 6.

The cavity 31 has a dented section 312 formed to surround the convex section 311 entirely. A circumferential side face of the dented section 312 extends from the bottom surface of the cavity 31 to the opening surface of the cavity 31, inclined with respect to the injection axis X2 (i.e., constituting the circumferential side face of the cavity 31). An inner diameter of the cavity 31 at the dented section 312 gradually increases from the bottom surface of the cavity 31 to the opening surface of the cavity 31.

Note that the shape of the combustion chamber 17 is not limited to that illustrated in FIG. 2. That is, the shapes of the cavity 31, the upper surface of the piston 3, the ceiling surface of the combustion chamber 17, etc. are suitably changeable. For example, the cavity 31 may have a symmetric shape with respect to the center axis X1 of the cylinder 11. The inclined surfaces 1311 and 1312 may have a symmetric shape with respect to the center axis X1 of the cylinder 11. Further, the cavity 31 may be formed with a shallow section shallower than the dented section 312, at a position opposing to a spark plug 25 described later.

The geometric compression ratio of the engine body 2 is set between 14:1 and 30:1. As described later, within some of operating ranges of the engine body 2, the engine body 2 performs SPCCI combustion in which SI combustion and CI combustion are combined. In the SPCCI combustion operation, CI combustion is performed by utilizing heat generated by the SI combustion and pressure increase. In this engine 1, it is unnecessary to raise the temperature of the combustion chamber 17 when the piston 3 reaches CTDC for the mixture gas to self-ignite, i.e., the compression end temperature.

That is, although the engine 1 performs the CI combustion, its geometric compression ratio may be set relatively low. Setting the low geometric compression ratio is advantageous in reducing a cooling loss and a mechanical loss. For example, the geometric compression ratio of the engine body 2 may be set to 14:1 to 17:1 in regular specifications (the octane number of the fuel is about 91) and to 15:1 to 18:1 in high-octane specifications (the octane number of the fuel is about 96).

The cylinder head 13 is formed with an intake port 18 for each cylinder 11. As illustrated in FIG. 3, the intake port 18 includes two intake ports of a first intake port 181 and a second intake port 182. The first intake port 181 and the second intake port 182 are arranged in axial directions of the crankshaft 15, i.e., front-and-rear directions of the engine body 2. The intake port 18 communicates with the combustion chamber 17. Although not illustrated in detail, the intake port 18 is a so-called tumble port. That is, the intake port 18 has a shape to form a tumble flow in the combustion chamber 17.

An intake valve 21 is disposed in the intake port 18. The intake valve 21 opens and closes the intake port 18 to and from the combustion chamber 17. The engine body 2 is provided with a valve operating mechanism of the intake valve 21. The intake valve 21 is opened and closed by the valve operating mechanism at a given timing. This valve operating mechanism of the intake valve 21 may be a variable valve mechanism which makes a valve timing and/or valve lift variable.

In this configuration example, the variable valve mechanism is a phase variable valve operating mechanism which makes open and close timings of the intake valve 21 variable while fixing the opening thereof, and as illustrated in FIG. 4, has an intake electrically-operated S-VT (Sequential-Valve Timing) 23. The intake electrically-operated S-VT 23 is continuously variable of a rotational phase of an intake camshaft within a given angular range. Thus, the open and close timings of the intake valve 21 continuously change. Note that the valve operating mechanism of the intake valve 21 may have a hydraulically-operated S-VT instead of the electrically-operated S-VT. The S-VT 23 is one example of an "intake valve close timing adjusting mechanism."

The cylinder head 13 is also formed with an exhaust port 19 for each cylinder 11. As illustrated in FIG. 3, the exhaust port 19 also includes two exhaust ports of a first exhaust port 191 and a second exhaust port 192. The first exhaust port 191 and the second exhaust port 192 are arranged in the front-and-rear directions of the engine body 2. The exhaust port 19 communicates with the combustion chamber 17.

An exhaust valve 22 is disposed in the exhaust port 19. The exhaust valve 22 opens and closes the exhaust port 19 to and from the combustion chamber 17. The engine body 2 is provided with a valve operating mechanism of the exhaust valve 22. The exhaust valve 22 is opened and closed by the valve operating mechanism at a given timing. This valve operating mechanism of the exhaust valve 22 may be a variable valve mechanism which makes a valve timing and/or valve lift variable.

In this configuration example, the variable valve mechanism is a phase variable valve operating mechanism which makes open and close timings of the exhaust valve 22 variable while fixing the opening thereof, and as illustrated in FIG. 4, has an exhaust electrically-operated S-VT 24. The exhaust electrically-operated S-VT 24 is continuously variable of a rotational phase of an exhaust camshaft within a given angular range. Thus, the open and close timings of the exhaust valve 22 continuously change. Note that the valve operating mechanism of the exhaust valve 22 may have a hydraulically-operated S-VT instead of the electrically-operated S-VT.

The engine 1 adjusts the length of an overlap period of the open timing of the intake valve 21 and the close timing of the exhaust valve 22 by the intake electrically-operated S-VT 23 and the exhaust electrically-operated S-VT 24, so that hot burned gas is enclosed within the combustion chamber 17. That is, internal EGR (Exhaust Gas Recirculation) gas is introduced into the combustion chamber 17. Further, by adjusting the length of the overlap period, residual gas (burned gas) inside the combustion chamber 17 is scavenged.

The injector 6 is attached to the cylinder head 13 for each cylinder 11. The injector 6 injects the fuel directly into the combustion chamber 17. The injector 6 is one example of a "fuel injection part." The injector 6 is disposed in a valley portion of the pent roof where the inclined surface 1311 on the intake side and the inclined surface 1312 on the exhaust side intersect, so as to be oriented into the combustion chamber 17, and opposed to the cavity 31.

As illustrated in FIG. 2, the injection axis X2 of the injector 6 is in parallel to the center axis X1 of the cylinder 11 and located on the exhaust side of the center axis X1 of the cylinder 11. The injection axis X2 of the injector 6 coincides with the position of the convex section 311 of the cavity 31. Note that the injection axis X2 of the injector 6 may coincide with the center axis X1 of the cylinder 11. Also in this case, it is desirable that the injection axis X2 of the injector 6 coincides with the position of the convex section 311 of the cavity 31.

Although not illustrated in detail, the injector 6 is constructed by a multi-port fuel injection valve having a plurality of nozzle ports. As illustrated by two-dotted chain lines in FIG. 2, the injector 6 injects the fuel so that it radially spreads obliquely downward from the radial center of a ceiling portion of the combustion chamber 17.

In this configuration example, the injector 6 has ten nozzle ports, and the nozzle ports are arranged at an even angular interval in the circumferential direction of the injector 6. As illustrated in the upper part of FIG. 2, the axes of the nozzle ports do not circumferentially overlap with the spark plug 25. That is, the spark plug 25 is sandwiched between the axes of two adjacent nozzle ports. Thus, the fuel spray injected from the injector 6 is avoided from directly hitting the spark plug 25 and wetting an electrode.

A fuel supply system 61 is connected to the injector 6. The fuel supply system 61 includes a fuel tank 63 configured to store the fuel and a fuel supply path 62 connecting the fuel tank 63 with the injector 6. A fuel pump 65 and a common rail 64 are provided in the fuel supply path 62. The fuel pump 65 pumps the fuel to the common rail 64.

In this configuration example, the fuel pump 65 is a plunger pump which is driven by the crankshaft 15. The common rail 64 stores the fuel pumped from the fuel pump 65 at high fuel pressure. When the injector 6 opens, the fuel stored in the common rail 64 is injected into the combustion chamber 17 from the nozzle ports of the injector 6.

The fuel supply system 61 is able to supply the fuel at a high pressure of 30 MPa or higher, to the injector 6. A highest fuel pressure of the fuel supply system 61 may be, for example, about 120 MPa. The pressure of the fuel supplied to the injector 6 may be changed according to an operating state of the engine body 2. Note that the structure of the fuel supply system 61 is not limited to the above structure.

The spark plug 25 is attached to the cylinder head 13 for each cylinder 11. The spark plug 25 forcibly ignites the mixture gas inside the combustion chamber 17. The spark plug 25 is one example of "igniting part."

In this configuration example, as illustrated in FIG. 2, the spark plug 25 is disposed at the intake side of the combustion chamber 17 with respect to the center axis X1 of the cylinder 11. The spark plug 25 is adjacent to the injector 6 and located between the two intake ports. Further the spark plug 25 is attached to the cylinder head 13 to extend downwardly, toward the center of the combustion chamber 17 in a tilted posture with respect to up-and-down directions of the cylinder head 13. The electrode of the spark plug 25 is located near the ceiling surface of the combustion chamber 17 to be oriented toward inside the combustion chamber 17.

An intake passage 40 is connected to one side of the engine body 2. The intake passage 40 communicates with the intake ports 18 of the cylinders 11 and leads to the combustion chamber 17 through the intake ports 18. The intake passage 40 is a passage through which gas to be introduced into the combustion chamber 17 flows. An air cleaner 41 which filters fresh air is disposed in an upstream end part of the intake passage 40. A surge tank 42 is disposed near a downstream end of the intake passage 40. A part of the intake passage 40 downstream of the surge tank 42 forms independent passages branching for the respective cylinders 11. Downstream ends of the independent passages communicate with the intake ports 18 of the cylinders 11, respectively.

A throttle valve 43 is disposed in the intake passage 40 between the air cleaner 41 and the surge tank 42. The throttle valve 43 adjusts an introduction amount of fresh air into the combustion chamber 17 by adjusting an opening thereof.

A booster 44 is disposed in the intake passage 40 downstream of the throttle valve 43. The booster 44 boosts the gas inside the intake passage 40 to be introduced into the combustion chamber 17.

In this configuration example, the booster 44 is a supercharger which is driven by the engine body 2. The booster 44 may be, for example, of a Lysholm type. The booster 44 may have any structure, for example, of a Roots type, a Vane type, or a centrifugal type.

An electromagnetic clutch 45 (one example of a boost controller) is interposed between the booster 44 and the engine body 2. The electromagnetic clutch 45 controls the flow of a driving force between the booster 44 and the engine body 2, for example, it transmits the driving force from the engine body 2 to the booster 44 or interrupts the transmission of the driving force therebetween. As is described later, by an ECU 10 (Engine Control Unit) switching the connection/disconnection of the electromagnetic clutch 45, the on/off of the booster 44 is switched. In this engine 1, whether to boost the gas to be introduced into the combustion chamber 17 by the booster 44 or not is switchable therebetween.

An intercooler 46 is disposed in the intake passage 40 downstream of the booster 44. The intercooler 46 cools the gas compressed in the booster 44. The intercooler 46 may be, for example, of a water cooling type. The intercooler 46 may be, for example, of a hydraulically cooling type.

A bypass passage 47 is connected to the intake passage 40. The bypass passage 47 connects a part of intake passage 40 upstream of the booster 44 to a part of the intake passage 40 downstream of the intercooler 46 so as to bypass the booster 44 and the intercooler 46. An air bypass valve 48 is disposed in the bypass passage 47. The air bypass valve 48 adjusts a flow rate of the gas flowing through the bypass passage 47.

When the booster 44 is turned off, that is, when the electromagnetic clutch 45 is disconnected, the air bypass valve 48 is fully opened. Thus, the gas flowing through the intake passage 40 bypasses the booster 44 (i.e., without passing through the booster 44 and the intercooler 46), passes through the bypass passage 47 to flow into the surge tank 42, and is then introduced into the combustion chamber 17 of the engine body 2. The engine body 2 operates in a non-boosted state, that is, in a naturally aspirated state.

When the booster 44 is turned on (that is, when the electromagnetic clutch 45 is connected), the gas flowing in the intake passage 40 passes through the booster 44 and the intercooler 46 and then flows into the surge tank 42. Here, if the air bypass valve 48 is open, the gas passed through the booster 44 partially flows back upstream of the booster 44 through the bypass passage 47 from the surge tank 42. The backflow amount of the gas changes according to the opening of the air bypass valve 48. The boosting pressure of gas inside the intake passage 40 is controlled by the adjusting the opening of the air bypass valve 48.

In this configuration example, the booster 44, the bypass passage 47, and the air bypass valve 48 constitute a boosting system 49 in the intake passage 40.

The engine body 2 has a swirl generating part which generates a swirl flow inside the combustion chamber 17. As illustrated in FIG. 3, the swirl generating part is a swirl control valve (SCV) 56 attached to the intake passage 40. The SCV 56 is disposed in a passage. The passage is one of a primary passage 401 and a secondary passage 402 communicating with the first intake port 181 and the second intake port 182, respectively.

The SCV 56 is an opening regulating valve which is capable of adjusting an opening of a cross section of the secondary passage 402. A swirl flow with an intensity corresponding to the opening of the SCV 56 is generated inside the combustion chamber 17. The swirl flow circulates in the counter-clockwise direction in FIG. 3 as indicated by the arrows (also see the white outlined arrows in FIG. 2).

When the opening of the SCV 56 is small, the flow rate of the intake air into the combustion chamber 17 from the first intake port 181 relatively increases while the flow rate of the intake air into the combustion chamber 17 from the second intake port 182 is relatively reduced. Thus, the swirl flow inside the combustion chamber 17 becomes strong. When the opening of the SCV 56 is large, the flow rates of the intake air into the combustion chamber 17 from the first intake port 181 and the second intake port 182 become substantially even, and therefore the swirl flow inside the combustion chamber 17 becomes weak. When the SCV 56 is fully opened, a swirl flow does not occur.

Note that alternatively/additionally to attaching the SCV 56 to the intake passage 40, the swirl generating part may adopt a structure in which the open periods of the two intake valves 21 are shifted so as to introduce the intake air into the combustion chamber 17 from only one of the intake valves 21. By opening only one of the two intake valves 21, the intake air is introduced unevenly into the combustion chamber 17, and thus, the swirl flow is generated in the combustion chamber 17. Alternatively, the shapes of the intake ports 18 may be devised so that the swirl generating part generates the swirl flow in the combustion chamber 17.

An exhaust passage 50 is connected to another side of the engine body 2 opposite from the intake passage 40. The exhaust passage 50 communicates with the exhaust ports 19 of the cylinders 11 and leads to the combustion chamber 17 through the exhaust ports 19. The exhaust passage 50 is a passage through which the exhaust gas discharged from the combustion chamber 17 flows. Although not illustrated in detail, an upstream part of the exhaust passage 50 constitutes independent passages branched for the respective cylinders 11. Upstream ends of the independent passages are connected to the exhaust ports 19 of the cylinders 11, respectively.

An exhaust gas purification system having a plurality of (two in the example of FIG. 1) catalytic converters is disposed in the exhaust passage 50. Although not illustrated, the catalytic converter on the upstream side is disposed in an engine bay and has a three-way catalyst 511 and a GPF (Gasoline Particulate Filter) 512. On the other hand, the catalytic converter on the downstream side is disposed outside the engine bay and has a three-way catalyst 513.

Note that the exhaust gas purification system is not limited to have the illustrated structure. For example, the GPF 512 may be omitted. Moreover, the catalytic converter is not limited to have the three-way catalyst 511 or 513. Furthermore, the order of arrangements of the three-way catalysts 511 and 513, and the GPF 512 may suitably be changed.

An EGR passage 52 constituting an external EGR system is connected between the intake passage 40 and the exhaust passage 50. The EGR passage 52 is a passage for recirculating a portion of the burned gas to the intake passage 40, and connects the intake passage 40 to the exhaust passage 50. An upstream end of the EGR passage 52 is connected to the exhaust passage 50 between the upstream catalytic converter and the downstream catalytic converter. A downstream end of the EGR passage 52 is connected to the intake passage 40 upstream of the booster 44. The external EGR system is a so-called low-pressure EGR system.

A water-cooling type EGR cooler 53 is disposed in the EGR passage 52. The EGR cooler 53 cools the burned gas. An EGR valve 54 is also disposed in the EGR passage 52. The EGR valve 54 adjusts the flow rate of the burned gas in the EGR passage 52. The recirculation amount of the cooled burned gas, i.e., the external EGR gas, is adjustable by changing the opening of the EGR valve 54.

In this configuration example, an EGR system 55 includes the external EGR system comprised of the EGR passage 52 and the EGR valve 54, and the internal EGR system comprised of the intake electrically-operated S-VT 23 and the exhaust electrically-operated S-VT 24 described above.

The engine 1 includes the ECU 10 configured to operate the engine body 2. As illustrated in FIG. 4, the ECU 10 is a control unit based on a well-known microcomputer and includes a central processing unit (CPU) 101 configured to execute program(s)/instructions, memory 102 comprised of RAM(s) (Random Access Memory) and ROM(s) (Read Only Memory) and configured to store the program(s)/instructions and data, an input/output bus 103 configured to input and output electric signals. The ECU 10 also includes an operating range determining module 104 configured to determine an operating range of the engine, a compression end temperature estimating module 105 configured to determine whether a temperature of gas inside the combustion chamber 17 exceeds a given temperature at a top dead center of compression stroke, a combustion mode selecting module 106 configured to select one of a first combustion mode and a second combustion mode, and a boost controlling module 107 configured to signal the electromagnetic clutch 45 to switch a state of the booster 44 between a boosting state and a non-boosting state. The CPU 101 is configured to execute these modules to perform their respective functions. These modules are stored in the memory 102 as software.

The ECU 10 is connected to the injector 6, the spark plug 25, the intake electrically-operated S-VT 23, the exhaust electrically-operated S-VT 24, the fuel supply system 61, the throttle valve 43, the EGR valve 54, the electromagnetic clutch 45 of the booster 44, the air bypass valve 48, and the SCV 56. As illustrated in FIGS. 1 and 4, various sensors SW1 to SW16 are connected to the ECU 10. The sensors SW1 to SW16 output detection signals to the ECU 10.

The sensors include an airflow sensor SW1 and a first intake air temperature sensor SW2 disposed in the intake passage 40 downstream of the air cleaner 41, a first pressure sensor SW3 disposed in the intake passage 40 downstream of the connecting position of the EGR passage 52 and upstream of the booster 44, a second intake air temperature sensor SW4 disposed in the intake passage 40 downstream of the booster 44 and upstream of the connecting position of the bypass passage 47, a second pressure sensor SW5 attached to the surge tank 42, pressure sensors SW6 attached to the cylinder head 13 corresponding to the cylinders 11, respectively, and an exhaust temperature sensor SW7 disposed in the exhaust passage 50.

The airflow sensor SW1 detects the flow rate of fresh air in the intake passage 40. The first intake air temperature sensor SW2 detects a temperature of the fresh air flowing in the intake passage 40. The first pressure sensor SW3 detects pressure of the gas flowing into the booster 44. The second air temperature sensor SW4 detects a temperature of the gas flowed out of the booster 44. The second pressure sensor SW5 detects pressure of the gas at a position downstream of the booster 44. Each pressure sensor SW6 detects pressure in the combustion chamber 17. The exhaust temperature sensor SW7 detects a temperature of the exhaust gas discharged from the combustion chamber 17.

The sensors further include a linear $O_2$ sensor SW8 disposed in the exhaust passage 50 upstream of the upstream catalytic converter, a lambda $O_2$ sensor SW9 disposed in the upstream catalytic converter downstream of the three-way catalyst 511, a water temperature sensor SW10, a crank angle sensor SW11, an intake cam angle sensor SW12, and an exhaust cam angle sensor SW13 which are attached to the engine body 2, an accelerator opening sensor SW14 attached to an accelerator pedal mechanism, an EGR pressure difference sensor SW15 disposed in the EGR passage 52, and a fuel pressure sensor SW16 attached to the common rail 64 of the fuel supply system 61.

The linear $O_2$ sensor SW8 and the lambda $O_2$ sensor SW9 respectively detect an oxygen concentration within the exhaust gas. The water temperature sensor SW10 detects a temperature of the cooling water. The crank angle sensor SW11 detects a rotational angle of the crankshaft 15. The intake cam angle sensor SW12 detects a rotational angle of the intake camshaft. The exhaust cam angle sensor SW13 detects a rotational angle of the exhaust camshaft. The accelerator opening sensor SW14 detects an accelerator opening. The EGR pressure difference sensor SW15 detects a difference in pressure between positions upstream and downstream of the EGR valve 54. The fuel pressure sensor SW16 detects pressure of the fuel to be supplied to the injector 6.

Based on these detection signals, the ECU 10 determines the operating state of the engine body 2 and calculates control amounts of the various devices. The ECU 10 outputs control signals related to the calculated control amounts to the injector 6, the spark plug 25, the intake electrically-operated S-VT 23, the exhaust electrically-operated S-VT 24, the fuel supply system 61, the throttle valve 43, the EGR valve 54, the electromagnetic clutch 45 of the booster 44, the air bypass valve 48, and the SCV 56.

For example, the ECU 10 sets a target torque of the engine body 2 and determines a target boosting pressure, based on the detection signal of the accelerator opening sensor SW14 and a preset map. Then, the ECU 10 executes a feedback control to bring the boosting pressure to the target boosting pressure by adjusting the opening of the air bypass valve 48 based on the target boosting pressure and a pressure difference between the upstream and downstream sides of the booster 44 obtained from the detection signals of the first pressure sensor SW3 and the second pressure sensor SW5.

Further, the ECU 10 sets a target EGR ratio, i.e., a ratio of the EGR gas with respect to all the gas in the combustion chamber 17, based on the operating state of the engine body 2 and a preset map. Then, the ECU 10 determines a target EGR gas amount based on the target EGR ratio and the intake air amount based on the detection signal of the accelerator opening sensor SW14. Then, the ECU 10 executes a feedback control to bring the external EGR gas amount introduced into the combustion chamber 17 to the target EGR gas amount by adjusting the opening of the EGR valve 54 based on the pressure difference between the upstream and downstream sides of the EGR valve 54 obtained from the detection signal of the EGR pressure difference sensor SW15.

Further, the ECU 10 executes an air-fuel ratio feedback control when a given control condition is satisfied. For example, based on the oxygen concentrations within the exhaust gas detected by the linear $O_2$ sensor SW8 and the lambda $O_2$ sensor SW9, the ECU 10 adjusts the fuel injection amount of the injector 6 to bring the air-fuel ratio of the mixture gas to a desired value.

Note that details of the control of the engine 1 by the ECU 10 are described later.

<Operating Range of Engine>

Figure 5:
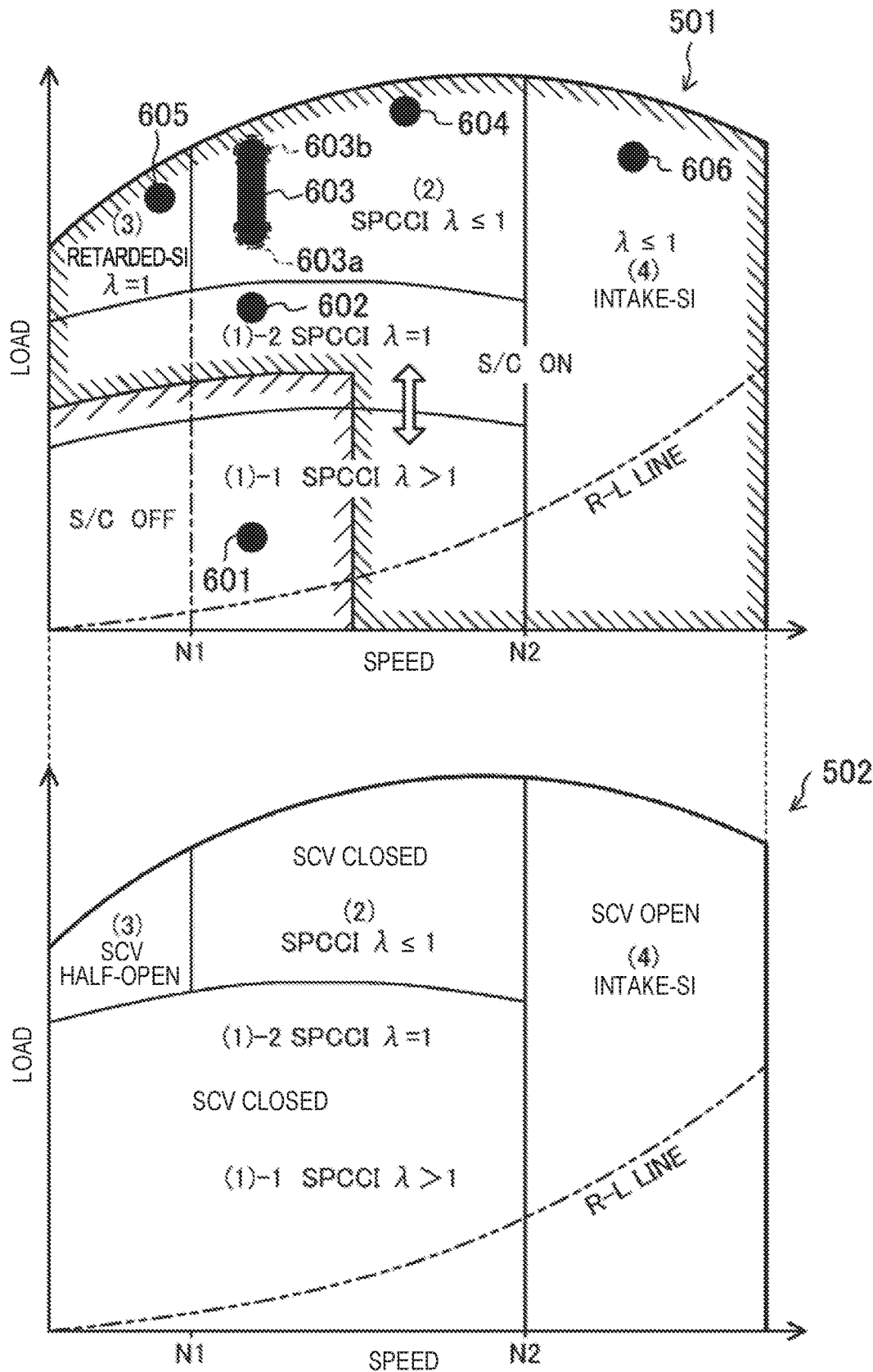
FIG. 5 shows charts illustrating operating range maps of the engine.

FIG. 5 illustrates operating range maps 501 and 502 of the engine 1 in a warmed-up state. The operating range maps 501 and 502 of the engine 1 are divided into five ranges in terms of the engine load and the engine speed.

For example, the five ranges include: a low load range (1)-1 including an idle operation and extending in low and medium engine speed ranges; a medium load range (1)-2 in which the engine load is higher than the low load range and extending in the low and medium engine speed ranges; a high-load medium-speed range (2) in which the engine load is higher than the medium load range (1)-2 and which is located in a high load range including a full engine load; a high-load low-speed range (3) located in the high load range and in which the engine speed is lower than the high-load medium-speed range (2); and a high speed range (4) in which the engine speed is higher than the low load range (1)-1, the medium load range (1)-2, the high-load medium-speed range (2), and the high-load low-speed range (3).

Here, the low speed range, the medium speed range, and the high speed range may be defined by substantially evenly dividing, in the engine speed direction, the entire operating range of the engine 1 into three ranges of the low speed range, the medium speed range and the high speed range. In the example of FIG. 5, the engine speed lower than a speed N1 is defined as low, the engine speed higher than a speed N2 is defined as high, and the engine speed between engine speeds N1 and N2 is defined as medium. For example, the speed N1 may be about 1,200 rpm and the speed N2 may be about 4,000 rpm.

The high-load medium-speed range (2) may be a range in which combustion pressure exceeds 900 kPa. In FIG. 5, the operating range maps 501 and 502 of the engine 1 are separately illustrated for the sake of easier understanding. The map 501 illustrates a state of the mixture gas and a combustion mode within each range, and a driving range and a non-driving range of the booster 44. The map 502 illustrates the opening of the SCV 56 within each range. Note that the two-dotted chain line in FIG. 5 indicates the road-load line of the engine 1.

Mainly for improving the fuel efficiency and the exhaust gas performance, the engine 1 performs combustion by compression self-ignition within the low load range (1)-1, the medium load range (1)-2, and the high-load medium-speed range (2). Further, the engine 1 performs the combustion by spark-ignition within the other ranges, specifically, the high-load low-speed range (3) and the high speed range (4). Hereinafter, the operation of the engine 1 within each range is described in detail with reference to the fuel injection timing and the ignition timing illustrated in FIG. 6, the open timing of the intake valve 21 and the close timing of the exhaust valve 22 illustrated in FIG. 7, and the EGR ratio of the external EGR illustrated in FIG. 9.

<Low Load Range (1)-1>

When the engine body 2 is operating within the low load range (1)-1, the engine 1 performs the CI combustion as described above. In the combustion caused by self-ignition, the timing of the self-ignition changes greatly if the temperature inside the combustion chamber 17 varies before the compression starts. Therefore, within the low load range (1)-1, the engine 1 performs the SPCCI combustion in which the SI combustion and the CI combustion are combined.

Figure 6:
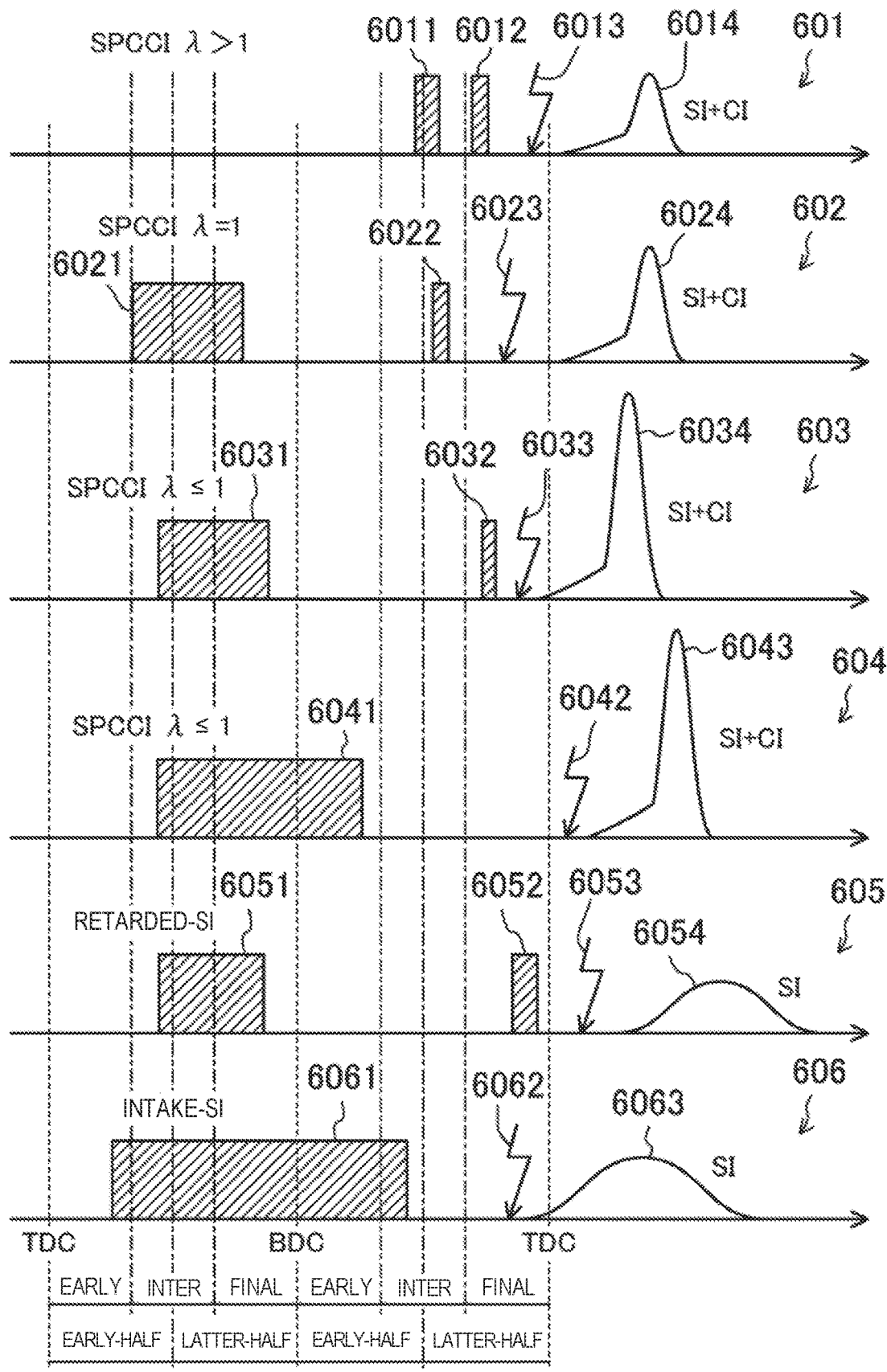
FIG. 6 shows charts illustrating a fuel injection timing, an ignition timing, and a combustion waveform in each operating range.
Figure 7:
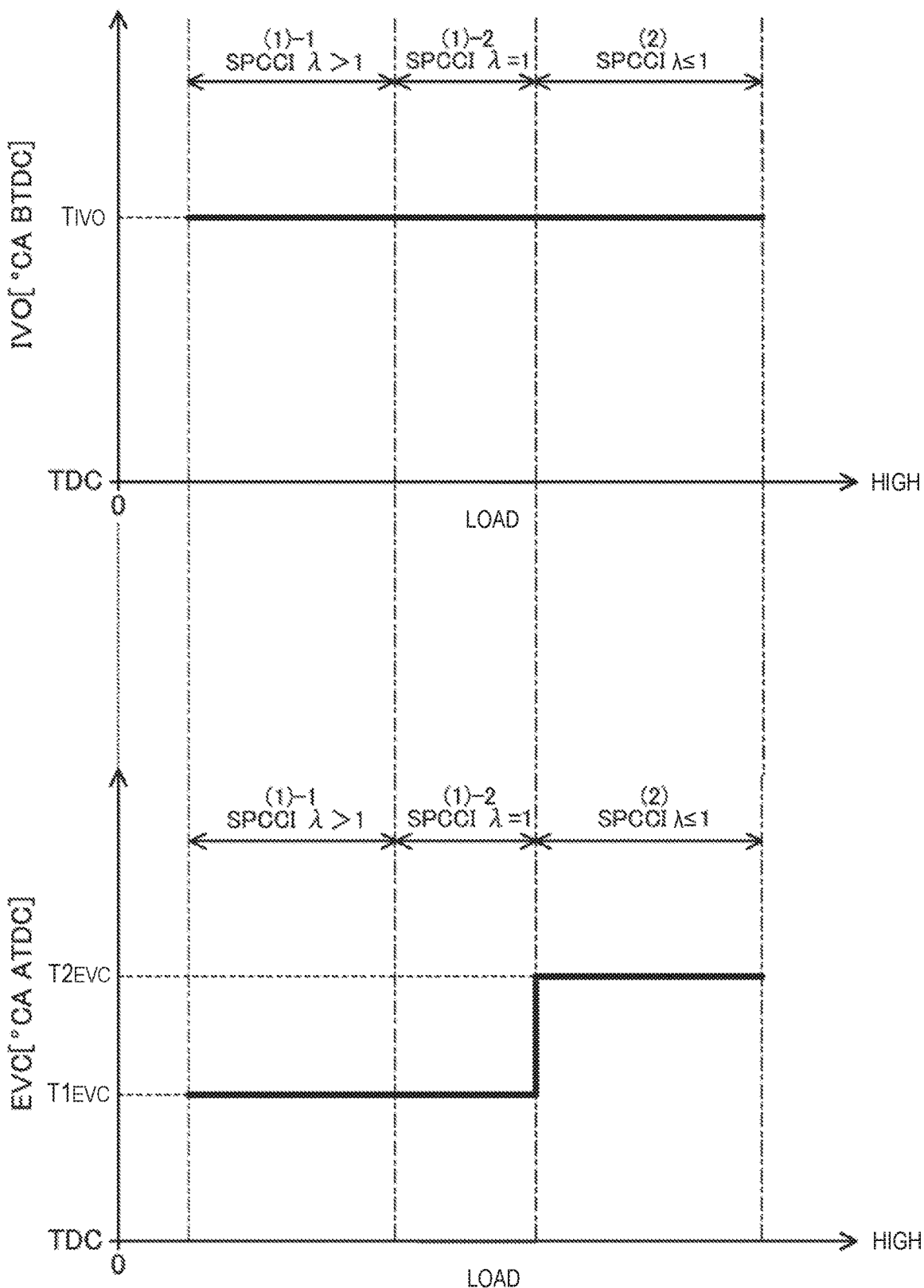
FIG. 7 shows in an upper part a chart illustrating an open timing of an intake valve within an operating range in which SPCCI combustion is performed, and in a lower part a chart illustrating a close timing of an exhaust valve within the operating range in which the SPCCI combustion is performed.

A reference character 601 in FIG. 6 indicates one example of fuel injection timings (reference characters 6011 and 6012) and an ignition timing (a reference character 6013), and a combustion waveform (i.e., a waveform indicating a change in heat generation rate with respect to the crank angle; a reference character 6014) when the engine body 2 is operating in the operating state of the reference character 601 within the low load range (1)-1.

In the SPCCI combustion, the spark plug 25 forcibly ignites the mixture gas inside the combustion chamber 17 so that it is subjected to the SI combustion through flame propagation, and the heat generated by this combustion raises the temperature inside the combustion chamber 17 and the pressure inside the combustion chamber 17 rises by flame propagation, which leads to the CI combustion of unburned mixture gas by self-ignition.

A variation in the temperature inside the combustion chamber 17 before the compression starts is absorbable by adjusting the heat generation amount in the SI combustion. Therefore, even when the temperature inside the combustion chamber 17 varies before the compression starts, for example, by controlling the ignition timing to adjust the start timing of the SI combustion, the timing of self-ignition is controlled.

In the case of performing the SPCCI combustion, the spark plug 25 ignites the mixture gas at a given timing near CTDC (TDC on the right side in FIG. 6). Thus, the combustion through flame propagation starts. The heat generation in the SI combustion is slower than the heat generation in the CI combustion. Therefore, the waveform of the heat generation rate has a relatively gentle rising slope. Moreover, although not illustrated, a pressure variation (dp/dθ) in the combustion chamber 17 is also gentler in the SI combustion than in the CI combustion.

When the temperature and pressure inside the combustion chamber 17 rise due to the SI combustion, the unburned mixture gas self-ignites. In the example of FIG. 6, the slope of the waveform of the heat generation rate changes from gentle to sharp at the self-ignition timing (a reference character 6014), i.e., the waveform of the heat generation rate has a flexion point at a timing when the CI combustion starts.

After the CI combustion starts, the SI combustion and the CI combustion are performed in parallel. In the CI combustion, since the heat generation is larger than in the SI combustion, the heat generation rate becomes relatively high. Note that since the CI combustion is performed after CTDC, the piston 3 descends by motoring, and the slope of the waveform of the heat generation rate in the CI combustion is avoided from becoming excessively high. Further, the pressure variation (dp/dθ) in the CI combustion also becomes relatively gentle.

The pressure variation is usable as an index expressing combustion noise. Since the SPCCI combustion is able to lower the pressure variation as described above, it becomes possible to avoid combustion noise becoming excessively loud. Thus, combustion noise is reduced below an allowable value.

The SPCCI combustion ends by finishing the CI combustion. The CI combustion has a shorter combustion period than in the SI combustion. Thus, the SPCCI combustion advances the combustion end timing compared to the SI combustion. In other words, the SPCCI combustion brings the combustion end timing on the expansion stroke closer to CTDC. Therefore, the SPCCI combustion is advantageous in improving the fuel efficiency of the engine 1 than the SI combustion.

When the engine body 2 is operating within the low load range (1)-1, the EGR system 55 introduces the EGR gas into the combustion chamber 17 so as to improve fuel efficiency of the engine 1.

For example, by providing the positive overlap period in which the intake valve 21 and the exhaust valve 22 are both opened near TDC of the exhaust stroke, an internal EGR is performed in which a portion of the exhaust gas discharged from the combustion chamber 17 to the intake port 18 and the exhaust port 19 is returned into the combustion chamber 17 for reintroduction. Since the internal EGR introduces hot burned gas (internal EGR gas) into the combustion chamber 17, the temperature inside the combustion chamber 17 increases, which is advantageous in stabilizing the SPCCI combustion.

An open timing $T_{IVO}$ of the intake valve 21 is fixed or substantially fixed to a timing within ±5° of crank angle over all engine loads and speeds of the low load range (1)-1. As illustrated in the upper part of FIG. 7, the open timing $T_{IVO}$ of the intake valve 21 is preferably fixed. For example, the open timing $T_{IVO}$ of the intake valve 21 is 30° CA before CTDC. Thus, the close timing of the intake valve 21 is also fixed ($T_{IVC}$ illustrated in FIG. 8) in terms of crank angle over all engine loads and speeds of the low load range (1)-1.

A close timing $T1_{EVC}$ of the exhaust valve 22 is fixed or substantially fixed to a timing within ±5° of crank angle over all engine loads and speeds of the low load range (1)-1. As illustrated in the lower chart of FIG. 7, the close timing $T1_{EVC}$ of the exhaust valve 22 is preferably fixed. For example, the close timing $T1_{EVC}$ of the exhaust valve 22 is set to a timing 16.5° CA after CTDC. Thus, the open timing of the exhaust valve 22 is also fixed ($T1_{EVO}$ illustrated in FIG. 8) in terms of crank angle over all engine loads and speeds of the low load range (1)-1.

Figure 8:
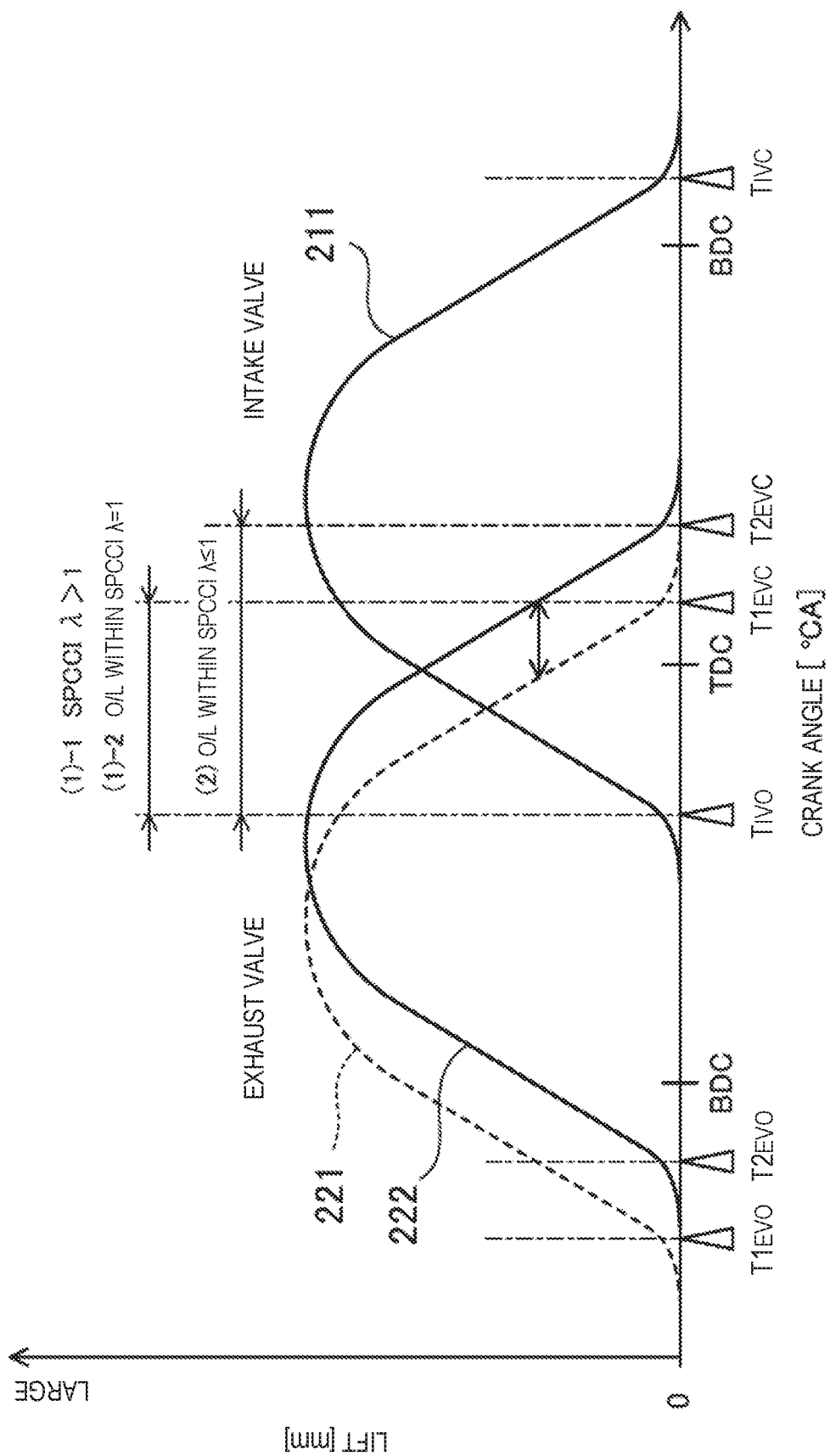
FIG. 8 is a chart illustrating the open and close timings of the intake and exhaust valves, and a positive overlap period within the operating range in which the SPCCI combustion is performed.

In this manner, the open timing $T_{IVO}$ and the close timing $T_{IVC}$ of the intake valve 21 and the open timing $T1_{EVO}$ and the close timing $T1_{EVC}$ of the exhaust valve 22 are, as expressed by a valve lift curve 211 of the intake valve 21 indicated by the solid line in FIG. 8 and a valve lift curve 221 of the exhaust valve 22 indicated by the dashed line, set so that the positive overlap period extends over a given crank angle range or more. For example, the positive overlap period may be set over 40° or more in terms of crank angle. In the above example of the open timing $T_{IVO}$ of the intake valve 21 and the close timing $T1_{EVC}$ of the exhaust valve 22, the positive overlap period is a period over 46.5° CA including CTDC.

Here, although the open timings $T_{IVO}$ and $T1_{EVO}$ and the close timings $T_{IVC}$ and $T1_{EVC}$ of the intake valve 21 and the exhaust valve 22 are not accurately illustrated, they are timings when the lift sharply rises or falls in the valve lift curves 211 and 221 of the respective valves, and is, for example, defined to be a timing of 0.3 mm lift. The same applies for the following description.

Figure 9:
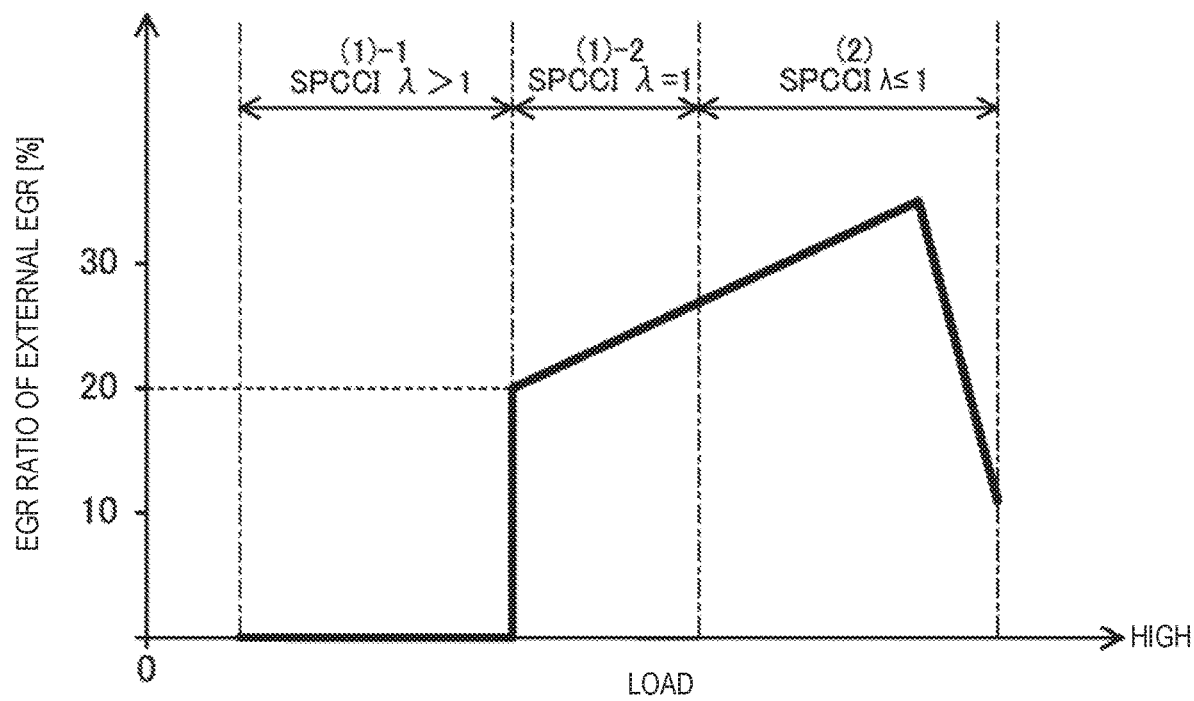
FIG. 9 is a chart illustrating an EGR ratio of external EGR within the operating range in which the SPCCI combustion is performed.

Note that within the low load range (1)-1, the EGR valve 54 is fully closed and, as illustrated in FIG. 9, the external EGR gas is not introduced into the combustion chamber 17.

The booster 44 is turned off when the engine body 2 is operating in a part of the low load range (1)-1. In detail, the booster 44 is turned off within a low speed segment of the low load range (1)-1 (see "S/C OFF"). Within a high speed segment of the low load range (1)-1, the booster 44 is turned on to increase the boosting pressure in order to secure a required intake charge amount corresponding to the engine speed being high (see "S/C ON").

When the booster 44 is turned off and the gas inside the intake passage 40 is not boosted, since the pressure inside the intake passage 40 is relatively low, during the positive overlap period, the internal EGR gas (hot burned gas) is introduced into the combustion chamber 17 as described above, so that the temperature inside the combustion chamber 17 rises, which is advantageous in stabilizing the SPCCI combustion within the low speed segment of the low load range (1)-1.

Further, when the booster 44 is turned on and the gas inside the intake passage 40 is boosted, since the pressure inside the intake passage 40 is relatively high, during the positive overlap period, the gas inside the intake passage 40 blows through the combustion chamber 17 of the engine body 2, to reach the exhaust passage 50. Therefore, the burned gas remaining inside the combustion chamber 17 is pushed out to the exhaust passage 50 to be scavenged.

Thus, within the low load range (1)-1, by switching on and off the booster 44, that is, whether to boost the gas inside the intake passage 40 or not, the internal EGR is performed at the lower speed side, and scavenging is performed at the higher speed side.

Also when the engine body 2 is operating within the low load range (1)-1, the SCV 56 is adjusted to be fully closed or have a given narrow opening. Thus, a strong swirl flow is formed inside the combustion chamber 17. The swirl flow is strong in an outer circumferential portion of the combustion chamber 17 and weak in a center portion. As described above, since the intake port 18 is a tumble port, an oblique swirl flow having a tumble component and a swirl component is formed in the combustion chamber 17.

When the engine body 2 operates within the low load range (1)-1, the swirl ratio is 4 or above. Here, "swirl ratio" may be defined as a value obtained by measuring an intake flow lateral angular speed for each valve lift, integrating these values, and dividing this integrated value by an engine angular speed. The intake flow lateral angular speed may be obtained based on a measurement using a rig test device illustrated in FIG. 11.

Figure 11:
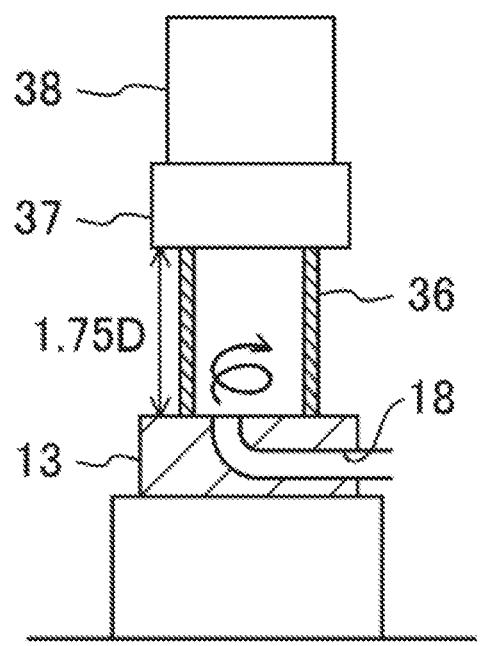
FIG. 11 is a diagram illustrating a rig test device for measuring a swirl ratio.

Specifically, the device illustrated in FIG. 11 is structured by placing the cylinder head 13 upside down on a pedestal to connect the intake port 18 to an intake air supply device (not illustrated), and placing a cylinder 36 on the cylinder head 13 to connect, at its upper end, to an impulse meter 38 having a honeycomb rotor 37. A lower surface of the impulse meter 38 is positioned 1.75D away from a mating surface between the cylinder head 13 and the cylinder 36. Here, "D" means a cylinder bore diameter. In this device, the impulse meter 38 measures torque which acts on the honeycomb rotor 37 by a swirl generated in the cylinder 36 due to the supply of the intake air (see the arrow in FIG. 11), and the intake flow lateral angular speed is obtained based on the torque.

Figure 12:
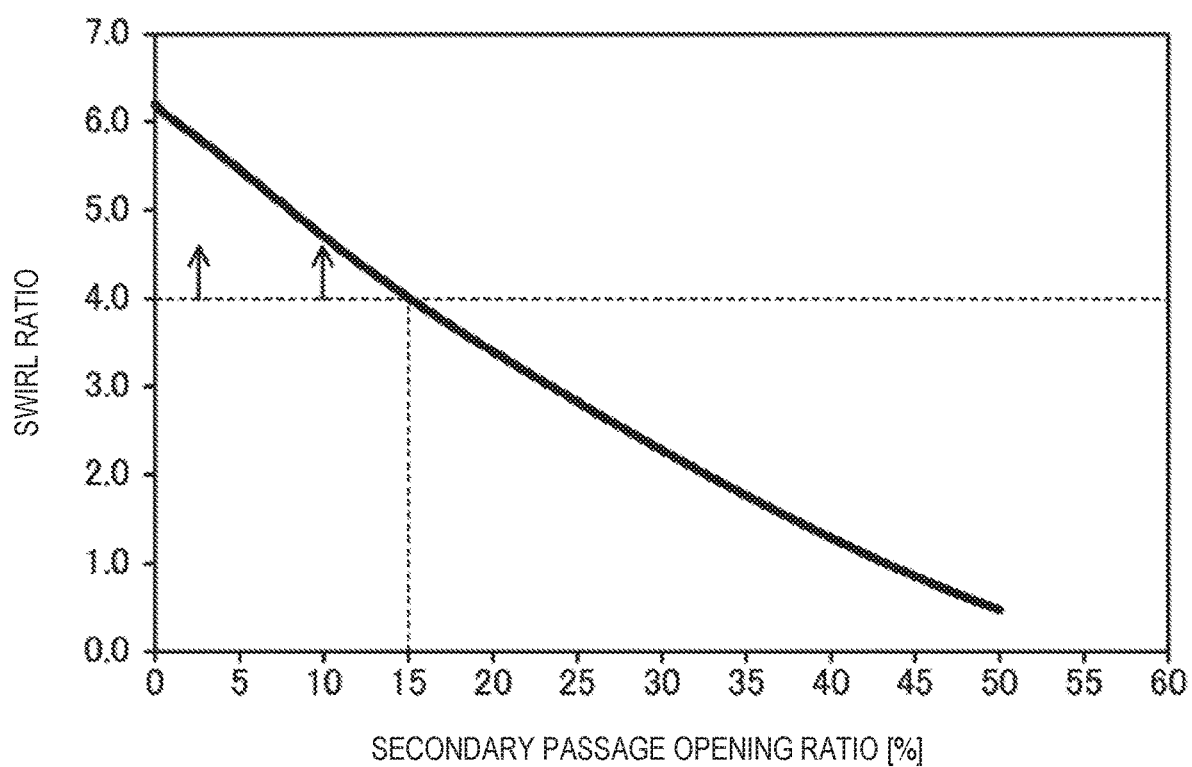
FIG. 12 is a chart illustrating a relationship between an opening ratio of a secondary passage and the swirl ratio.

FIG. 12 illustrates a relationship between the opening of the SCV 56 of the engine 1 and the swirl ratio. In FIG. 12, the opening of the SCV 56 is expressed by an opening ratio with respect to the cross section of the secondary passage 402 when fully opened. The opening ratio of the secondary passage 402 is 0% when the SCV 56 is fully closed, and increases from 0% as the opening of the SCV 56 increases. The opening ratio of the secondary passage 402 is 100% when the SCV 56 is fully opened.

As illustrated in FIG. 12, in the engine 1, the swirl ratio becomes around 6 when the SCV 56 is fully closed. When the engine 1 operates within the low load range (1)-1, the swirl ratio may be between 4 and 6. The opening of the SCV 56 may be adjusted within a range of the opening ratio of about 0% to 15%.

When the engine body 2 operates within the low load range (1)-1, the air-fuel ratio (A/F) of the mixture gas is leaner than the stoichiometric air-fuel ratio in the entire combustion chamber 17. That is, the excess air ratio λ of the mixture gas exceeds 1 in the combustion chamber 17 as a whole. More specifically, the A/F of the mixture gas in the entire combustion chamber 17 is 30:1 or higher. In this manner, generation of raw $NO_x$ is reduced and exhaust gas performance is improved.

When the engine body 2 operates within the low load range (1)-1, the mixture gas is stratified in the center portion and the outer circumferential portion of the combustion chamber 17. The center portion of the combustion chamber 17 is the portion where the spark plug 25 is disposed. The outer circumferential portion of the combustion chamber 17 is the portion around the center portion and in contact with a liner of the cylinder 11. The center portion of the combustion chamber 17 may be defined as a portion where the swirl flow is weak and the outer circumferential portion of the combustion chamber 17 may be defined as a portion where the swirl flow is strong.

The fuel concentration of the mixture gas in the center portion of the combustion chamber 17 is higher than the fuel concentration in the circumferential portion of the combustion chamber 17. For example, the A/F of the mixture gas in the center portion of the combustion chamber 17 is between 20:1 and 30:1, and the A/F of the mixture gas in the outer circumferential portion of the combustion chamber 17 is 35:1 or above. Note that the A/F is the air-fuel ratio at the ignition timing, and the same applies for the description below.

When the engine body 2 operates within the low load range (1)-1, the injector 6 injects the fuel into the combustion chamber 17 by splitting it into a plurality of injections on the compression stroke (the reference characters 6011 and 6012). For example, the fuel injection is performed in each of an intermediate stage and a final stage of the compression stroke. The intermediate stage and the final stage of the compression stroke may be the intermediate stage and the final stage when the compression stroke is evenly divided into three stages of an initial stage, the intermediate stage, and the final stage in terms of the crank angle.

The fuel injected in the intermediate stage of the compression stroke diffuses inside the combustion chamber 17 until the ignition timing and forms the mixture gas in the center portion and the outer circumferential portion inside the combustion chamber 17. Since the fuel injected in the final stage of the compression stroke ignites within a short period of time, it is conveyed to near the spark plug 25 in the center portion of the combustion chamber 17 by the swirl flow without spreading much, and forms the mixture gas in the center portion of the combustion chamber 17 together with a portion of the fuel injected in the intermediate stage of the compression stroke. In this manner, the mixture gas is stratified in the center portion and the outer circumferential portion of the combustion chamber 17 as described above.

After the fuel injection is ended, the spark plug 25 ignites the mixture gas in the center portion of the combustion chamber 17 at the given timing before CTDC (the reference character 6013). Since the fuel concentration of the mixture gas in the center portion at this timing is relatively high at this point, ignitability improves and the SI combustion by the flame propagation stabilizes. By stabilizing the SI combustion, the CI combustion starts at a suitable timing. That is, the controllability of the CI combustion improves in the SPCCI combustion. As a result, when the engine body 2 operates within the low load range (1)-1, both the reduction of the generation of combustion noise and the improvement of the fuel efficiency by the shortening of the combustion period are achieved.

The fuel injection timing and the number of times of fuel injections performed when the engine body 2 operates within the low load range (1)-1 are changed according to the engine load.

For example, when the engine load is low, the number of times of the fuel injections performed on the compression stroke is increased and the completion timing of the fuel injection is retarded. That is, when the engine load is low, the split number of fuel injections (the number of times of performing fuel injections by splitting the fuel for one combustion cycle) performed on the compression stroke is increased and the timing of the final fuel injection is retarded. In this manner, when the engine load is low, the fuel amount supplied into the combustion chamber 17 decreases, however, the diffusion of the fuel injected on the compression stroke is suppressed. As a result, the size of the mixture gas layer of which fuel concentration is relatively high, formed in the center portion of the combustion chamber 17, becomes small.

Further, when the engine load is high, the number of times of the fuel injections performed on the compression stroke is reduced and their injection timings are advanced. As a result of advancing the fuel injection timings, without performing the fuel injection on the compression stroke, the fuel may be injected in the split injections on the intake stroke. When the engine load is high, the fuel may be injected in a lump on the intake stroke. In this manner, when the engine load is high, the fuel amount supplied into the combustion chamber 17 increases and it becomes easier for the fuel to diffuse. As a result, the size of the mixture gas layer of which fuel concentration is relatively high, formed in the center portion of the combustion chamber 17, becomes large.

Since the engine 1 performs the SPCCI combustion by making the mixture gas leaner than the stoichiometric air-fuel ratio within the low load range (1)-1 as described above, the low load range (1)-1 may be referred to as "SPCCI lean range."

<Medium Load Range (1)-2>

Also when the engine body 2 is operating within the medium load range (1)-2, the engine 1 performs the SPCCI combustion similarly to the low load range (1)-1. The reference character 602 in FIG. 6 indicates one example of the fuel injection timings (reference characters 6021 and 6022) and the ignition timing (a reference character 6023), and the combustion waveform (a reference character 6024) when the engine body 2 is operating in the operating state of the reference character 602 within the medium load range (1)-2.

The EGR system 55 introduces the EGR gas into the combustion chamber 17 also when the operating state of the engine body 2 is within the medium load range (1)-2.

For example, within the medium load range (1)-2, similarly to the low load range (1)-1, by providing the positive overlap period in which the intake valve 21 and the exhaust valve 22 are both opened near TDC of the exhaust stroke, the internal EGR in which a portion of the exhaust gas discharged from the combustion chamber 17 to the intake port 18 and the exhaust port 19 is returned into the combustion chamber 17 for reintroduction is performed. That is, the internal EGR gas is introduced into the combustion chamber 17.

Similarly to the low load range (1)-1, the open timing $T_{IVO}$ of the intake valve 21 is fixed or substantially fixed, preferably fixed, to a timing within ±5° of crank angle over all engine loads or speeds of the medium load range (1)-2. In this example, as illustrated in the upper part of FIG. 7, the open timing $T_{IVO}$ of the intake valve 21 is fixed to the same timing as that of the low load range (1)-1, for example, 30° CA before CTDC.

Further, similarly to the low load range (1)-1, the close timing $T1_{EVC}$ of the exhaust valve 22 is also fixed or substantially fixed, preferably fixed, to a timing within ±5° of crank angle over all engine loads and speeds of the medium load range (1)-2. In this example, as illustrated in the lower part of FIG. 7, the close timing $T1_{EVC}$ of the exhaust valve 22 is fixed to the same timing as that of the low load range (1)-1, for example, 16.5° CA after CTDC.

In this manner, the open timing $T_{IVO}$ and the close timing $T_{IVC}$ of the intake valve 21 and the open timing $T1_{EVO}$ and the close timing $T1_{EVC}$ of the exhaust valve 22 are, as expressed by the valve lift curve 211 of the intake valve 21 indicated by the solid line in FIG. 8 and the valve lift curve 221 of the exhaust valve 22 indicated by the dashed line, set so that the positive overlap period extends over the same given crank angle range as that of the low load range (1)-1 (40° CA) or more, e.g., to a period over 46.5° CA including CTDC.

The booster 44 is turned off when the engine body 2 is operating in a part of the medium load range (1)-2. In detail, the booster 44 is turned off within a low-load low-speed segment of the medium load range (1)-2 (see "S/C OFF"). Within a high engine load segment of the medium load range (1)-2, the booster 44 is turned on to increase the boosting pressure in order to secure a required intake charge amount corresponding to the increase in the fuel injection amount.

Within a high engine speed segment of the medium speed range (1)-2, the booster 44 is turned on to increase the boosting pressure in order to secure a required intake charge amount corresponding to the increase in the engine speed.

When the booster 44 is turned off and the gas inside the intake passage 40 is not boosted, since the pressure inside the intake passage 40 is relatively low, during the positive overlap period, the internal EGR gas (hot burned gas) is introduced into the combustion chamber 17 and the temperature inside the combustion chamber 17 rises as described above, which is advantageous in stabilizing the SPCCI combustion within the low-load and low-speed segment of the medium load range (1)-2.

Further, when the booster 44 is turned on and the gas inside the intake passage 40 is boosted, since the pressure inside the intake passage 40 is relatively high, during the positive overlap period, the residual gas (hot burned gas) inside the combustion chamber 17 is scavenged as described above.

Further, within the medium load range (1)-2, the external EGR in which the exhaust gas cooled by the EGR cooler 53 is introduced into the combustion chamber 17 through the EGR passage 52 is performed. That is, the external EGR gas at a lower temperature than the internal EGR gas is introduced into the combustion chamber 17. The EGR ratio of the external EGR, i.e., a ratio of the external EGR gas mass with respect to entire gas mass introduced into the combustion chamber 17 is suitably adjusted at 20% or above as illustrated in FIG. 9. The EGR ratio increases as the engine load increases. Within the medium load range (1)-2, at least one of the internal EGR gas and the external EGR gas is introduced into the combustion chamber 17 to adjust the temperature inside the combustion chamber 17 to an appropriate temperature.

Also when the engine body 2 operates within the medium load range (1)-2, similarly to the low load range (1)-1, the SCV 56 is adjusted to be fully closed or have a given narrow opening. Thus, a strong swirl flow at a swirl ratio of 4 or above is formed inside the combustion chamber 17. Since turbulence kinetic energy in the combustion chamber 17 increases by enhancing the swirl flow, the flame of the SI combustion propagates promptly and the SI combustion is stabilized. Further the controllability of the CI combustion improves by stabilizing the SI combustion. Thus, the timing of the CI combustion in the SPCCI combustion is made appropriate. As a result, the generation of combustion noise is reduced and fuel efficiency is improved. Further, the variation in torque between cycles is reduced.

When the engine body 2 operates within the medium load range (1)-2, the air-fuel ratio (A/F) of the mixture gas is at the stoichiometric air-fuel ratio (A/F=14.7:1) in the entire combustion chamber 17. At the stoichiometric air-fuel ratio, the three-way catalyst purifies the exhaust gas discharged from the combustion chamber 17, and thus the exhaust gas performance of the engine 1 improves. The A/F of the mixture gas may be set to remain within a purification window of the three-way catalyst (i.e., an air-fuel ratio width exhibiting the three-way purification function). Therefore, the excess air ratio λ of the mixture gas may be 1.0±0.2.

When the engine body 2 operates within the medium load range (1)-2, the injector 6 dividedly injects the fuel into the combustion chamber 17 on the intake stroke and the compression stroke (the reference characters 6021 and 6022). For example, the first injection 6021 in which the fuel is injected in the period from the intermediate stage to the final stage of the intake stroke and the second injection 6022 in which the fuel is injected in the latter half of the compression stroke are performed. The intermediate stage and the final stage of the intake stroke may be the intermediate stage and the final stage when the intake stroke is evenly divided into three stages of an initial stage, the intermediate stage, and the final stage. Further, the early half and latter half of the compression stroke may be defined by evenly dividing the compression stroke into two in terms of the crank angle.

The fuel for the first injection 6021 is injected at a timing away from the ignition timing, and since the piston 3 is away from TDC at this point, the fuel also reaches a squish area 171 (see the lower part of FIG. 2) formed outside the cavity 31, is distributed substantially evenly within the combustion chamber 17 to form the mixture gas. The fuel for the second injection 6022 is injected at a timing when the piston 3 is close to CTDC, therefore it enters into the cavity 31 and forms the mixture gas in the section within the cavity 31.

Due to injecting the fuel into the cavity 31 by the second injection 6022, the flow of gas occurs in the section within the cavity 31. When the time to the ignition timing is long, the turbulence kinetic energy inside the combustion chamber 17 attenuates as the compression stroke progresses. However, since the injection timing of the second injection 6022 is close to the ignition timing compared to that of the first injection 6021, the spark plug 25 ignites the mixture gas in the section within the cavity 31 while keeping the high turbulence kinetic energy therewithin. Thus, the speed of the SI combustion increases. Since the SI combustion becomes stable when the speed of the SI combustion increases, the controllability of the CI combustion by the SI combustion improves.

By performing a second injection 6022 in the latter half of the compression stroke, at a high engine load within the medium load range (1)-2, the temperature inside the combustion chamber 17 is lowered by latent heat of vaporization of the fuel, and thus, abnormal combustion, such as pre-ignition or knocking, is prevented. Moreover, the fuel injected in the second injection 6022 is stably combusted through flame propagation. A ratio between the injection amount of the first injection 6021 and the injection amount of the second injection 6022 may be, for example, 95:5. Note that particularly in the operating state where the engine load is low within the medium load range (1)-2, the second injection 6022 may be omitted.

By the injector 6 performing the first injection 6021 and the second injection 6022, a substantially homogeneous mixture gas in which the excess air ratio $\lambda$ is 1.0±0.2 is formed inside the combustion chamber 17. Since the mixture gas is substantially homogeneous, the improvement in fuel efficiency by reducing the unburned fuel loss and the improvement in the exhaust gas performance by avoiding the smoke (soot) generation are achieved. Here, the excess air ratio $\lambda$ is preferably 1.0 to 1.2.

By the spark plug 25 igniting the mixture gas at the given timing before CTDC (the reference character 6023), the mixture gas combusts through flame propagation. After this combustion starts, the unburned mixture gas self-ignites and causes the CI combustion. The fuel injected in the second injection 6022 mainly causes the SI combustion. The fuel injected in the first injection 6021 mainly causes the CI combustion.

As described above, within the medium load range (1)-2, since the engine 1 performs the SPCCI combustion by setting the mixture gas to have the stoichiometric air-fuel ratio, the medium load range (1)-2 may be referred to as "SPCCI $\lambda$=1 range."

<High-Load Medium-Speed Range (2)>

Also when the engine body 2 is operating within the high-load medium-speed range (2), the engine 1 performs the SPCCI combustion similarly to the low load range (1)-1 and the medium load range (1)-2.

When performing the SPCCI combustion within the high-load medium-speed range (2), the engine 1 adjusts the close timing of the intake valve 21 so that the effective compression ratio of the engine body 2 becomes 80% or above of the geometric compression ratio.

The reference character 603 in FIG. 6 indicates one example of the fuel injection timings (reference characters 6031 and 6032) and the ignition timing (a reference character 6033), and the combustion waveform (a reference character 6034) when the engine body 2 is operating in the operating state 603 at a low speed segment within the high-load medium-speed range (2) of the engine body 2. Note that as illustrated in FIG. 5, the operating state 603 has a width in the engine load direction. Further, the reference character 604 in FIG. 6 indicates one example of the fuel injection timing (a reference character 6041) and the ignition timing (a reference character 6042), and the combustion waveform (a reference character 6043) when the engine body 2 is operating in the operating state 604 at a high speed segment within the high-load medium-speed range (2) of the engine body 2.

The EGR system 55 introduces the EGR gas into the combustion chamber 17 also when the engine body 2 operates within the high-load medium-speed range (2).

For example, also within the high-load medium-speed range (2), the external EGR in which the exhaust gas cooled by the EGR cooler 53 is introduced into the combustion chamber 17 through the EGR passage 52 is performed. The EGR ratio of the external EGR is suitably adjusted within a range of 20% and above as illustrated in FIG. 9. Within the medium load range (1)-2 and the high-load medium-speed range (2), the EGR ratio continuously increases as the engine load increases. Within the high-load medium-speed range (2), by introducing the external EGR gas cooled by the EGR cooler 53 into the combustion chamber 17, the temperature inside the combustion chamber 17 is adjusted to an appropriate temperature and the abnormal combustion, such as pre-ignition of the mixture gas or knocking, is prevented.

Figure 10:
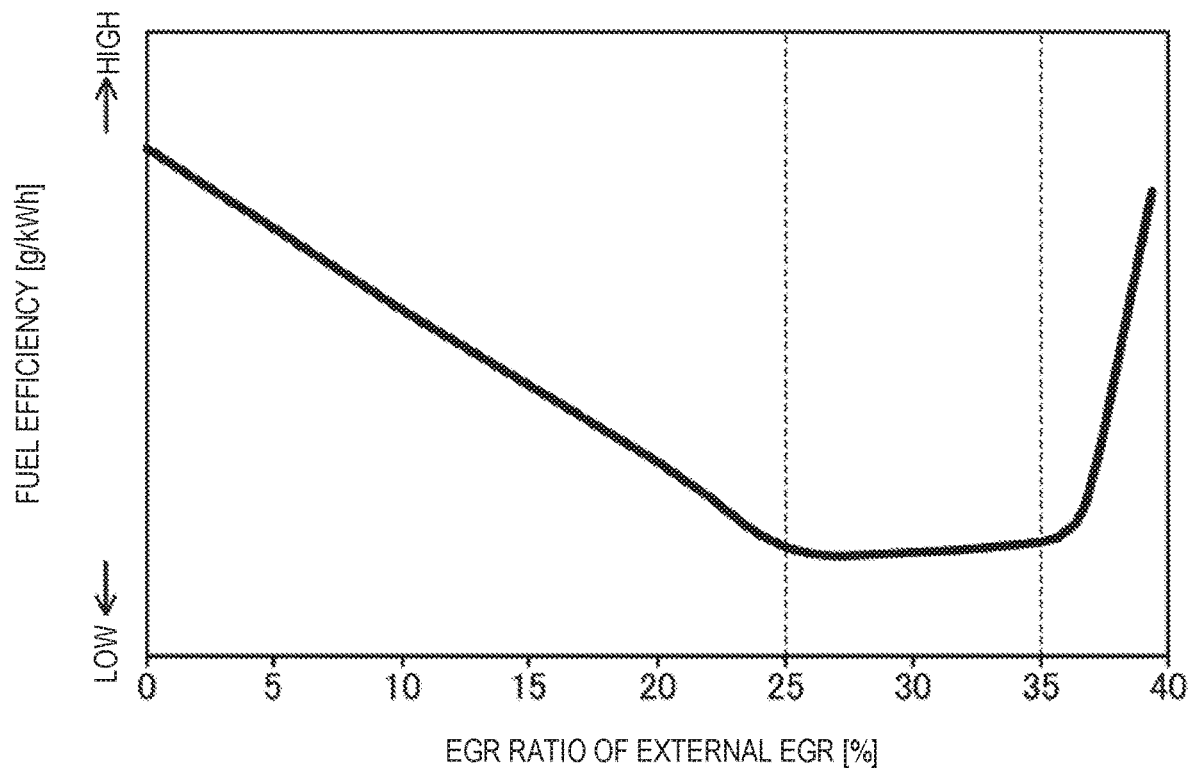
FIG. 10 is a chart illustrating a relationship between the EGR ratio of the external EGR and fuel efficiency within a high load range.

FIG. 10 illustrates a relationship between the EGR ratio of the external EGR and fuel efficiency. As illustrated in FIG. 10, when the engine body 2 is in the operating state within the high load range, fuel efficiency of the engine 1 can be expected to improve as the EGR ratio increases to 25%. Between 25% and 35% of the EGR ratio, a high fuel efficiency is maintained. On the other hand, once the EGR ratio exceeds 35%, it becomes more difficult for the flame to propagate and the stability of the SI combustion drops sharply. Therefore, the improvement in fuel efficiency of the engine 1 can hardly be expected. For these reasons, to improve fuel efficiency, it is preferable to adjust the EGR ratio of the external EGR within a range of 35% and below.

Within the high-load medium-speed range (2), since the engine load approaching the full load corresponds to increasing the fuel amount, in such a case, the amount of fresh air to be introduced into the combustion chamber 17 needs to be increased. Therefore, when the engine load approaches the full load within the high-load medium-speed range (2), as illustrated in FIG. 9, the EGR ratio of the external EGR is reduced. Further within the high-load medium-speed range (2), the EGR ratio of the external EGR gradually increases as the engine load increases to a given load, while it gradually decreases as the engine load increases above the given load. Note that in the example of FIG. 9, the EGR ratio does not become zero also when the engine load is at the full load (i.e., corresponding to the right end of FIG. 9).

Further within the high-load medium-speed range (2), similarly to the low load range (1)-1 and the medium load range (1)-2, the positive overlap period in which the intake and exhaust valves 21 and 22 are both opened is provided near TDC of the exhaust stroke.

The open timing $T_{IVO}$ of the intake valve 21 is fixed or substantially fixed to a timing within ±5° of crank angle over all engine loads and speeds of the high-load medium-speed range (2), similarly to the low load range (1)-1 and the medium load range (1)-2. In this example, as illustrated in the upper part of FIG. 7, the open timing $T_{IVO}$ of the intake valve 21 is fixed to the same timing as that of the low load range (1)-1, for example, 30° CA before CTDC.

A close timing $T2_{EVC}$ of the exhaust valve 22 is fixed or substantially fixed to a timing within ±5° of crank angle over all engine loads and speeds of the high-load medium-speed range (2), similarly to the low load range (1)-1 and the medium load range (1)-2. In this example, as illustrated in the lower part of FIG. 7, a close timing $T2_{EVC}$ of the exhaust valve 22 is fixed to a timing retarding than that of the low load range (1)-1, for example, 30° CA after CTDC.

In this manner, the open timing $T_{IVO}$ and the close timing $T_{IVC}$ of the intake valve 21 and an open timing $T2_{EVO}$ and the close timing $T2_{EVC}$ of the exhaust valve 22 are, as expressed by the valve lift curve 211 of the intake valve 21 indicated by the solid line in FIG. 8 and a valve lift curve 222 of the exhaust valve 22 indicated by another solid line, set so that the positive overlap period extends over a given crank angle range larger than that of the low load range (1)-1 and the medium load range (1)-2 (40° CA) or more. In the above example of the open timing of the intake valve 21 and the close timing of the exhaust valve 22, the positive overlap period is a period over 60° CA including CTDC.

Further, according to the setting of the close timing $T_{IVC}$ of the intake valve 21 regarding such an overlap period, it is possible to set the effective compression ratio of the engine body 2 to or above 80% of the geometric compression ratio within the high-load medium-speed range (2). That is, when the geometric compression ratio of the engine body 2 is 14:1, the effective compression ratio of the engine body 2 within the high-load medium-speed range (2) is at or above 14×0.8:1=11.2:1, when the geometric compression ratio of the engine body 2 is 16:1, the effective compression ratio of the engine body 2 within the high-load medium-speed range (2) is at or above 16×0.8:1=12.8:1, and when the geometric compression ratio of the engine body 2 is 18:1, the effective compression ratio of the engine body 2 within the high-load medium-speed range (2) is at or above 18×0.8:1=14.4:1.

Also when the engine body 2 is operating within the high-load medium-speed range (2), the booster 44 is turned on over the entire range (2) to increase the boosting pressure (see "S/C ON"). Thus, the residual gas (burned gas) inside the combustion chamber 17 is scavenged during the positive overlap period.

Also when the engine body 2 operates within the high-load medium-speed range (2), similarly to the low load range (1)-1, the SCV 56 is adjusted to be fully closed or have a given narrow opening. Thus, a strong swirl flow at a swirl ratio of 4 or above is formed inside the combustion chamber 17.

When the engine body 2 operates within the high-load medium-speed range (2), the air-fuel ratio (A/F) of the mixture gas is at or richer than the stoichiometric air-fuel ratio in the entire combustion chamber 17 (i.e., the excess air ratio λ of the mixture gas is λ≤1).

When the engine body 2 operates in the operating state 603 of the high-load medium-speed range (2), the injector 6 dividedly injects the fuel into the combustion chamber 17 on the intake stroke and the compression stroke (the reference characters 6031 and 6032). For example, the first injection 6031 in which the fuel is injected in the period from the intermediate stage to the final stage of the intake stroke and the second injection 6032 in which the fuel is injected in the final stage of the compression stroke are performed. Note that the first injection 6031 may start the fuel injection in an early half of the intake stroke. For example, the first injection 6031 may start the fuel injection at 280° CA before CTDC. Further, the second injection 6032 may be performed in the intermediate stage of the compression stroke as long as it is in the latter half of the compression stroke.

When the first-injection 6031 is started in the early half of the intake stroke, the fuel spray hits an opening edge of the cavity 31 so that a portion of the fuel enters the squish area 171 of the combustion chamber 17 (i.e., outside the cavity 31 (see FIG. 2)) and the remaining fuel enters the section within the cavity 31. Here, the swirl flow is strong in the outer circumferential portion of the combustion chamber 17 and weak in the center portion.

Therefore, the fuel that enters the section within the cavity 31 joins the inner side of the swirl flow. The fuel that enters the swirl flow remains within the swirl flow during the intake stroke and the compression stroke and forms the mixture gas for the CI combustion in the outer circumferential portion of the combustion chamber 17. The fuel that enters the inner side of the swirl flow also remains at the inner side of the swirl flow during the intake stroke and the compression stroke and forms the mixture gas for the SI combustion in the center portion of the combustion chamber 17.

When the engine body 2 operates within the high-load medium-speed range (2), by the first injection 6031 and the second injection 6032, the fuel concentration of the mixture gas in the outer circumferential portion of the combustion chamber 17 is brought higher than the fuel concentration of the mixture gas in the center portion, and the fuel amount in the mixture gas in the outer circumferential portion is brought larger than that in the center portion. For this, the injection amount of the first injection 6031 may be larger than the injection amount of the second injection 6032.

For example, the excess air ratio λ of the mixture gas in the center portion of the combustion chamber 17 is preferably 1 or below, and the excess air ratio λ of the mixture gas in the outer circumferential portion of the combustion chamber 17 is 1 or below, preferably below 1. The air-fuel ratio (A/F) of the mixture gas in the center portion of the combustion chamber 17 may be, for example, between 13:1 and the stoichiometric air-fuel ratio (14.7:1). The air-fuel ratio of the mixture gas in the center portion of the combustion chamber 17 may be leaner than the stoichiometric air-fuel ratio.

Further, the air-fuel ratio of the mixture gas in the outer circumferential portion may be, for example, between 11:1 and the stoichiometric air-fuel ratio, preferably between 11:1 and 12:1. Since the amount of fuel within the mixture gas increases in the outer circumferential portion when the excess air ratio λ of the outer circumferential portion of the combustion chamber 17 is set to below 1, the temperature is lowered by the latent heat of vaporization of the fuel. The air-fuel ratio of the mixture gas of the entire combustion chamber 17 may be between 12.5:1 and the stoichiometric air-fuel ratio, preferably between 12.5:1 and 13:1.

For example, the second injection 6032 may start the fuel injection at 10° CA before CTDC. By performing the second injection 6032 immediately before CTDC, the temperature inside the combustion chamber 17 is lowered by the latent heat of vaporization of the fuel. Although a low-temperature oxidation reaction of the fuel injected by the first injection 6031 progresses on the compression stroke and transitions to a high-temperature oxidation reaction before CTDC, by performing the second injection 6032 immediately before CTDC so as to lower the temperature inside the combustion chamber 17, the transition from the low-temperature oxidation reaction to the high-temperature oxidation reaction is avoided and the abnormal combustion, such as pre-ignition or knocking, is prevented. Note that a ratio between the injection amount of the first injection 6031 and the injection amount of the second injection 6032 may be, for example, 95:5.

The spark plug 25 ignites the mixture gas into the combustion chamber 17 near CTDC (the reference character 6033). Since the spark plug 25 is disposed in the center portion of the combustion chamber 17, the ignition of the spark plug 25 causes the mixture gas in the center portion to start the SI combustion through flame propagation. By performing the second injection 6032, the fuel concentration of the mixture gas near the spark plug 25 is high, therefore, in the SPCCI combustion, the flam is stably propagated after the ignition by the spark plug 25.

When the engine body 2 operates in the operating state 604 of the high-load medium-speed range (2), the injector 6 starts the fuel injection on the intake stroke (a reference character 6041). When the engine speed increases, the time length during which the fuel injected in the fuel injection 6041 causes a chemical reaction becomes shorter. Therefore, the second injection for suppressing the reaction of the mixture gas may be omitted.

For example, the fuel injection 6041 may start at 280° CA before CTDC. The injection 6041 may last over the intake stroke and end on the compression stroke. By setting the start of the fuel injection 6041 in the early half of the intake stroke, the mixture gas for the CI combustion is formed in the outer circumferential portion of the combustion chamber 17 and the mixture gas for the SI combustion is formed in the center portion of the combustion chamber 17 as described above.

Similar to the description above, the excess air ratio λ of the mixture gas in the center portion of the combustion chamber 17 is preferably 1 or below, and the excess air ratio λ of the mixture gas in the outer circumferential portion of the combustion chamber 17 is 1 or below, preferably below 1. The air-fuel ratio (A/F) of the mixture gas in the center portion of the combustion chamber 17 may be, for example, between 13:1 and the stoichiometric air-fuel ratio (14.7:1). The air-fuel ratio of the mixture gas in the center portion of the combustion chamber 17 may be leaner than the stoichiometric air-fuel ratio.

Further, the air-fuel ratio of the mixture gas in the outer circumferential portion may be, for example, between 11:1 and the stoichiometric air-fuel ratio, preferably between 11:1 and 12:1. The air-fuel ratio of the mixture gas of the entire combustion chamber 17 may be between 12.5:1 and the stoichiometric air-fuel ratio, preferably between 12.5:1 and 13:1.

The spark plug 25 ignites the mixture gas inside the combustion chamber 17 near CTDC on the retarding side of TDC (the reference character 6042). Since the spark plug 25 is disposed in the center portion of the combustion chamber 17, the ignition of the spark plug 25 causes the mixture gas in the center portion to start the SI combustion through flame propagation.

Within the high-load medium-speed range (2), the fuel injection amount increases as well as the temperature of the combustion chamber 17, therefore the CI combustion is likely to start early. In other words, within the high-load medium-speed range (2), the abnormal combustion, such as pre-ignition of the mixture gas or knocking easily occurs. However, since the temperature of the outer circumferential portion of the combustion chamber 17 is lowered by the latent heat of vaporization of the fuel as described above, the CI combustion is avoided from starting immediately after the mixture gas is spark-ignited.

In the SPCCI combustion within the high-load medium-speed range (2), by the combination of stratifying the mixture gas in the combustion chamber 17 and causing the strong swirl flow inside the combustion chamber 17, the SI combustion is sufficiently performed until the CI combustion starts. As a result, the generation of combustion noise is reduced and, since the combustion temperature does not become excessively high, generation of $NO_x$ is also reduced. Further, the variation in torque between cycles is reduced.

Further, also when the temperature of the outer circumferential portion of the combustion chamber 17 is low, the CI combustion also becomes slower, which is advantageous in reducing the generation of combustion noise. Moreover, since the combustion period is shortened by the CI combustion, within the high-load medium-speed range (2), the torque improves and also the thermal efficiency improves. Thus, by performing the SPCCI combustion within the high engine load range, the engine 1 is improved in the fuel efficiency while avoiding combustion noise.

Since the engine 1 performs the SPCCI combustion by setting the mixture gas to or leaner than the stoichiometric air-fuel ratio within the high-load medium-speed range (2) as described above, the high-load medium-speed range (2) may be referred to as "SPCCI λ≤1 range."

<High-Load Low-Speed Range (3)>

When the engine speed is low, the time length for the crank angle to change 1° becomes longer. Within the high-load low-speed range (3), if the fuel is injected into the combustion chamber 17 in the intake stroke or the early half of the compression stroke similarly to within the high-load medium-speed range (2), the reaction of the fuel excessively progresses which may cause the abnormal combustion, such as pre-ignition. Therefore, when the engine body 2 is operating within the high-load low-speed range (3), the engine 1 performs the SI combustion instead of the SPCCI combustion.

The reference character 605 in FIG. 6 indicates one example of the fuel injection timings (reference characters 6051 and 6052) and the ignition timing (a reference character 6053), and the combustion waveform (a reference character 6054) when the engine body 2 is operating in the operating state 605 within the high-load low-speed range (3).

The EGR system 55 introduces the EGR gas into the combustion chamber 17 when the operating state of the engine body 2 is within the high-load low-speed range (3). The engine 1 reduces the EGR gas amount as the engine load increases.

Also when the engine body 2 is operating within the high-load low-speed range (3), the booster 44 is turned on over the entire range (2) to increase the boosting pressure (see "S/C ON"). Thus, in the case where the positive overlap period is provided, the residual gas inside the combustion chamber 17 is scavenged.

When the engine body 2 is operating within the high-load low-speed range (3), the air-fuel ratio (A/F) of the mixture gas is at the stoichiometric air-fuel ratio (A/F=14.7:1) in the entire combustion chamber 17. The A/F of the mixture gas may be set to remain within a purification window of the three-way catalyst. Therefore, the excess air ratio λ of the mixture gas may be 1.0±0.2. By setting the air-fuel ratio of the mixture gas to the stoichiometric air-fuel ratio, the fuel efficiency improves within the high-load low-speed range (3).

Note that when the engine body 2 is operating within the high-load low-speed range (3), the fuel concentration of the mixture gas in the entire combustion chamber 17 may be set so that the excess air ratio λ is 1 or below and equal to or higher than the excess air ratio λ within the high-load medium-speed range (2), preferably higher than the excess air ratio λ within the high-load medium-speed range (2).

When the engine body 2 operates within the high-load low-speed range (3), the injector 6 dividedly injects the fuel into the combustion chamber 17 on the intake stroke and near CTDC (the reference characters 6051 and 6052). For example, the first injection 6051 in which the fuel is injected in the period from the intermediate stage to the final stage of the intake stroke and the second injection 6052 in which the fuel is injected in the period from the final stage of the compression stroke to an early stage of the expansion stroke (hereinafter, this period is referred to as "the retard period") are performed. The early stage of the expansion stroke may be the early stage when the expansion stroke is evenly divided into three stages of the early stage, an intermediate stage, and a final stage.

By injecting the fuel on the intake stroke in the first injection 6051, the formation period of time of the mixture gas is sufficiently secured. Additionally, by injecting the fuel in the retard period in the second injection 6052, the gas flow inside the combustion chamber 17 is enhanced immediately before the ignition. The fuel pressure is set to, for example, a high fuel pressure of 30 MPa or above. By increasing the fuel pressure, the fuel injection period and the mixture gas formation period are shortened and the gas flow inside the combustion chamber 17 is enhanced even more. An upper limit of the fuel pressure may be, for example, 120 MPa.

After the fuel is injected, the spark plug 25 ignites the mixture gas at a timing near CTDC (the reference character 6053). The spark plug 25 ignites, for example, after CTDC. As a result, the mixture gas causes the SI combustion on the expansion stroke. Thus, the CI combustion does not start.

In order to avoid the pre-ignition, the injector 6 may retard the fuel injection timing as the engine speed decreases. By this retarding of the injection timing, the fuel injection may end on the expansion stroke. Thus, when the engine 1 operates within the high-load low-speed range (3), the time length from the start of the fuel injection until the ignition is short. For this reason, in order to improve the ignitability of the mixture gas and to stabilize the SI combustion, the fuel needs to be promptly conveyed to near the spark plug 25. The achievement of this prompt conveyance of the fuel depends on the shape of the combustion chamber 17.

When the injector 6 injects the fuel in the retard period, since the piston 3 is located near CTDC, the fuel spray forms the mixture gas while mixing with the fresh air, flows downward along the convex section 311 of the cavity 31, and flows along the bottom surface and the circumferential surface of the cavity 31 to spread radially outward from the center of the combustion chamber 17. Then, the mixture gas reaches the opening of the cavity 31, flows along the inclined surface 1311 on the intake side and the inclined surface 1312 on the exhaust side, and further flows from the outer circumferential side toward the center of the combustion chamber 17. Thus, the fuel injected in the retard period is promptly conveyed as the mixture gas to near the spark plug 25.

When the engine body 2 operates within the high-load low-speed range (3), the engine 1 controls the opening of the SCV 56 to be larger than when operating within the high-load medium-speed range (2). The opening of the SCV 56 here may be, for example, about 50% (i.e., half opened). By this, the swirl flow is made weaker than when operating within the high-load medium-speed range (2).

As illustrated in the upper chart of FIG. 2, the axes of the nozzle ports of the injector 6 do not circumferentially overlap with the spark plug 25. The fuel injected from the nozzle ports flows in the circumferential direction due to the swirl flow inside the combustion chamber 17. By the swirl flow, this fuel is promptly conveyed to near the spark plug 25. The fuel is vaporized while being conveyed to near the spark plug 25.

On the other hand, if the swirl flow is excessively strong, the fuel flows in the circumferential direction and reaches away from the spark plug 25, and the fuel cannot promptly be conveyed to near the spark plug 25. For this reason, when the engine 1 operates within the high-load low-speed range (3), the swirl flow is made weaker than when operating within the high-load medium-speed range (2). As a result, the fuel is promptly conveyed to near the spark plug 25, thus the ignitability of the mixture gas improves and the SI combustion stabilizes.

Within the high-load low-speed range (3), since the engine 1 performs the SI combustion by injecting the fuel in the retard period from the final stage of the compression stroke to the early stage of the expansion stroke, the high-load low-speed range (3) may be referred to as "retarded-SI range."

<High Speed Range (4)>

When the engine speed is high, the time length for the crank angle to change 1° becomes shorter. Therefore, for example, within a high speed segment of the high load range, it is difficult to stratify the mixture gas in the combustion chamber 17 by performing the split injections as described above. Therefore, when the engine body 2 is operating within the high speed range (4), the engine 1 performs the SI combustion instead of the SPCCI combustion. Note that the high speed range (4) extends over the entire load direction from low load to high load.

The reference character 606 in FIG. 6 indicates one example of the fuel injection timings (a reference character 6061) and the ignition timing (a reference character 6062), and the combustion waveform (a reference character 6063) when the engine body 2 is operating in the operating state 606 within the high speed range (4).

The EGR system 55 introduces the EGR gas into the combustion chamber 17 when the operating state of the engine body 2 is within the high speed range (4). The engine 1 reduces the EGR gas amount as the engine load increases.

Also when the engine body 2 is operating within the high speed range (4), the booster 44 is turned on over the entire range (2) to increase the boosting pressure (see "S/C ON"). Thus, in the case where the positive overlap period is provided, the residual gas inside the combustion chamber 17 is scavenged.

When the engine body 2 operates within the high speed range (4), the engine 1 fully opens the SCV 56. Thus, no swirl flow is generated in the combustion chamber 17, and only the tumble flow is generated. By fully opening the SCV 56, charging efficiency is improved in the high speed range (4) and a pumping loss is reduced.

When the engine 1 operates within the high speed range (4), the air-fuel ratio (A/F) of the mixture gas is basically at the stoichiometric air-fuel ratio (A/F=14.7:1) in the entire combustion chamber 17. The excess air ratio λ of the mixture gas may be 1.0±0.2. Note that within a high load segment of the high speed range (4) including the full load, the excess air ratio λ of the mixture gas may be below 1.

When the engine body 2 is operating within the high speed range (4), the injector 6 starts the fuel injection on the intake stroke. Here, the injector 6 injects the fuel for one combustion cycle in a lump (the reference character 6061). Note that in the operating state 606, since the engine load is high, the fuel injection amount is large. The fuel injection period changes according to the fuel injection amount. By starting the fuel injection on the intake stroke, homogeneous or substantially homogeneous mixture gas is formed in the combustion chamber 17. Further, when the engine speed is high, since the vaporization time of the fuel is secured as long as possible, the unburned fuel loss and generation of soot are reduced.

The spark plug 25 ignites the mixture gas at a suitable timing before CTDC after the fuel injection is ended (the reference character 6062).

As described above, within the high speed range (4), since the engine 1 starts the fuel injection on the intake stroke and performs the SI combustion, the high speed range (4) may be referred to as "intake-SI range."

<Control Process of Engine within High-Load Medium-Speed Range (2)>

As described above, the high-load medium-speed range (2) is a range where the engine load is higher than a given load (e.g., combustion pressure is 900 kPa) and the SPCCI combustion is performed. Within the high-load medium-speed range (2), the effective compression ratio is set to 80% or above of the geometric compression ratio, and supercharging by the booster 44 is also performed. Therefore, within the high-load medium-speed range (2), the compression end temperature rises.

Within the high-load medium-speed range (2), a relatively large amount of the external EGR gas cooled by the EGR cooler 53 is introduced into the combustion chamber 17 so that the SI combustion of the SPCCI combustion is made slow. However, if the compression end temperature of the combustion chamber 17 rises excessively due to the engine load being high or the temperature of the intake air to be introduced into the combustion chamber 17 being high, etc., even if the EGR ratio is large, the CI combustion starts before the SI combustion is barely performed in the SPCCI combustion, and combustion noise may increase.

Therefore, within the high-load medium-speed range (2), the engine 1 adjusts the ignition timing according to the compression end temperature. Here, the description is given about the adjustment of the injection timing and the ignition timing by using the operating state indicated by the reference character 603 (i.e., the operating state 603 has a width in the engine load direction) within the high-load medium-speed range (2) as an example. Also within the high-load medium-speed range (2), when the engine speed is low, compared to when it is high, the time length from the start of fuel injection to the ignition becomes longer and it becomes easier for a chemical reaction of the mixture gas to progress, thus combustion noise easily increases.

Figure 13:
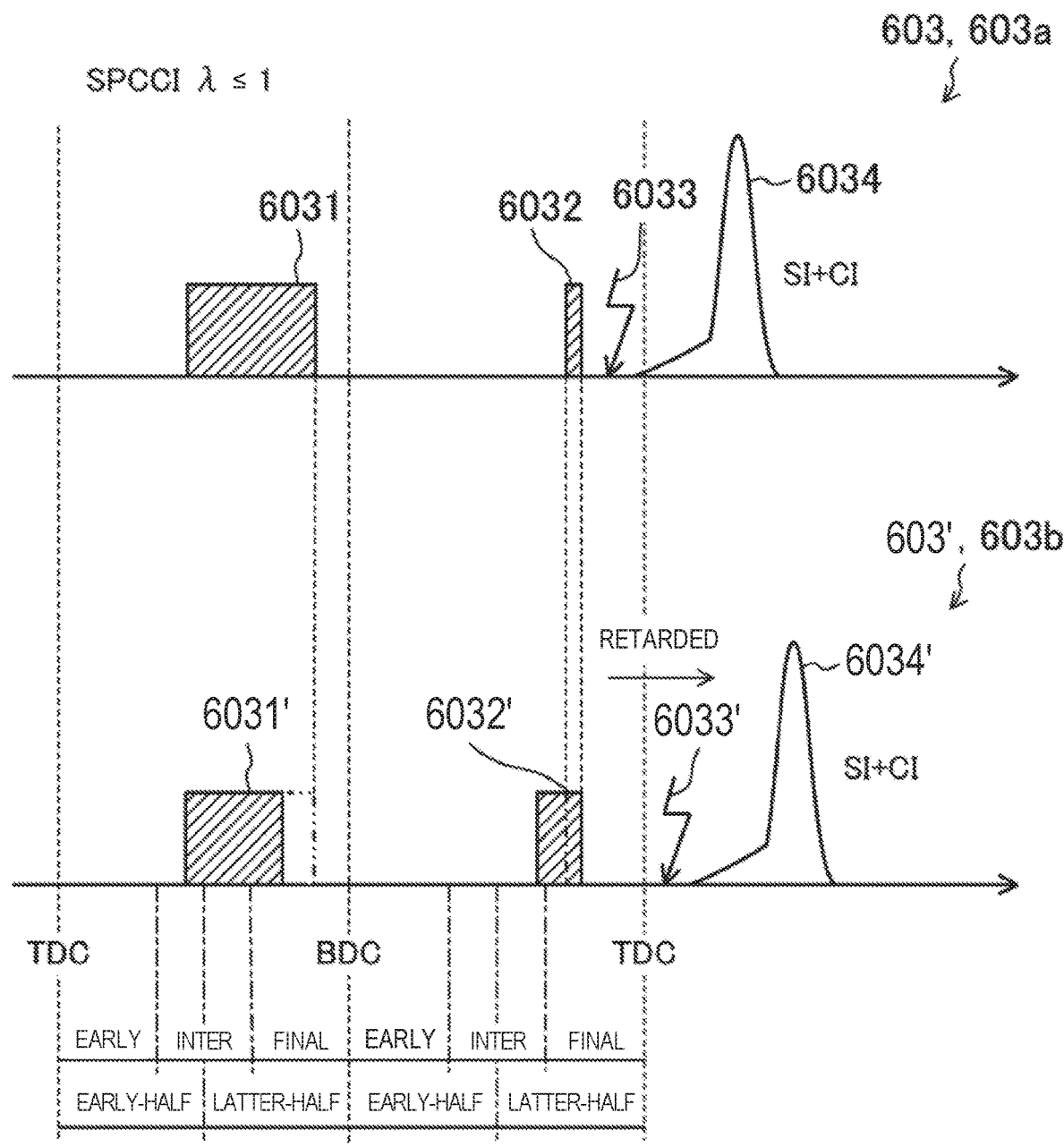
FIG. 13 is a chart illustrating the fuel injection timing, the ignition timing, and the combustion waveform within a high-load medium-speed range.

For example, when the compression end temperature is estimated not to exceed a given temperature set in advance, as indicated by the reference character 603 in the upper chart of FIG. 13, the first injection 6031 on the intake stroke and the second injection 6032 on the compression stroke are performed. By the spark plug 25 igniting the mixture gas before CTDC (a reference character 6033). Note that the fuel injection (the reference characters 6031 and 6032), the ignition (the reference character 6033), and the combustion waveform (the reference character 6034) are the same between the upper chart of FIG. 13 and the reference character 603 of FIG. 6.

On the other hand, when the compression end temperature is estimated to exceed the given temperature set in advance, as indicated by a reference character 603' in the lower chart of FIG. 13, a first injection 6031' on the intake stroke and a second injection 6032' on the compression stroke are performed. Note that the injection amount of the first injection 6031' is smaller than the injection amount of the first injection 6031, while the injection amount of the second injection 6032' is larger than the injection amount of the second injection 6032 by the amount that the injection amount of the first injection 6031' is smaller. Further, the start timing of the first injection 6031' is set the same as that of the first injection 6031, and the end timing of the second injection 6032' is set earlier than that of the first injection 6031 corresponding to the amount that its injection amount is smaller. On the other hand, the end timing of the second injection 6032' is set the same as that of the second injection 6032, and the start timing of the second injection 6032' is set earlier than that of the second injection 6032 corresponding to the amount that its injection amount is larger. The end timing of the second injection 6032' is in the latter half or the final stage of the compression stroke.

By reducing the injection amount of the first injection 6031' on the intake stroke, it is prevented that the chemical reaction of the mixture gas progresses excessively before the ignition. By increasing the injection amount of the second injection 6032' on the compression stroke, the temperature inside the combustion chamber 17 is reduced by latent heat of vaporization of the fuel, immediately before CTDC. Since the end timing of the second injection 6032' is not retarded although the injection amount of the second injection 6032' is increased, the time for the fuel of the second injection 6032' to form the mixture gas is secured. As a result, unburned components are increased and soot generation is reduced.

Moreover, when the compression end temperature is estimated to exceed the given temperature set in advance, the ignition timing is retarded to after CTDC (the reference character 6033').

By lowering the compression end temperature by the latent heat of vaporization of the fuel and starting the SI combustion of the SPCCI combustion on the expansion stroke, the CI combustion caused by compression ignition is started after the SI combustion is sufficiently performed. Thus, combustion noise of the SPCCI combustion is prevented from increasing.

In this case, the CI combustion is performed on the expansion stroke, however, since the combustion period of the CI combustion is made relatively short even on the expansion stroke, the center of gravity of combustion of the SPCCI combustion is prevented from being significantly far from CTDC. If the ignition timing of the SI combustion is retarded to the expansion stroke, the combustion period of the SI combustion during the expansion stroke becomes long, therefore the thermal efficiency of the engine greatly drops, however, in the SPCCI combustion, even when the ignition timing is retarded to the expansion stroke, the thermal efficiency of the engine 1 is prevented from degrading.

Next, an operation control of the engine 1 executed by the ECU 10 will be described with reference to the flowchart of FIGS. 14A and 14B. The flowcharts in FIGS. 14A and 14B relate to the operation control of the engine 1 within all the operating ranges of the engine 1 illustrated in FIG. 5, and include a control for adjusting the ignition timing within the high-load medium-speed range (2) described above.

First at 51 after the flow is started, the ECU 10 reads the signals from the various sensors SW1 to SW16. Next at S21, the ECU 10 determines whether the engine load is higher than the given load. If the engine load is higher than the given load, the process proceeds to S3, whereas if the engine load is lower than the given load, the process proceeds to S6.

At S3, the ECU 10 determines whether the engine 1 operates within the range in which the SPCCI combustion is performed. If the determination result of S3 is YES, the control process proceeds to S4. On the other hand, if the determination result of S3 is NO, the control process proceeds to S17 (see FIG. 14B).

At S4, the ECU 10 determines whether the external EGR ratio is above a given value. That is, whether the EGR gas is sufficiently introduced into the combustion chamber 17 is determined. If the determination result of S4 is NO, the control process proceeds to S5. On the other hand, if the determination result of S4 is YES, the control process proceeds to S9 (see FIG. 14B).

At S5, the ECU 10 determines whether the compression end temperature inside the combustion chamber 17 exceeds the given temperature is determined. The compression end temperature is estimated by the ECU 10 based on the signal values of the various sensors read at S1. If the determination result of S5 is YES, the control process proceeds to S13 (see FIG. 14B). On the other hand, if the determination result of S5 is NO, the control process proceeds to S9.

The operating state of the engine 1 shifts in response to the acceleration request. At S6, the ECU 10 determines whether the operating state after shifted is within the range in which the SPCCI combustion is performed. If the determination result of S6 is YES, the control process shifts to S7. If the determination result of S6 is NO, the control process proceeds to S17.

At S7, the ECU 10 determines whether the external EGR ratio in the operating state of the engine 1 after shifted is above the given value. If the determination result of S7 is NO, the control process proceeds to S8. On the other hand, if the determination result of S7 is YES, the control process proceeds to S9.

At S8, the ECU 10 determines whether the compression end temperature inside the combustion chamber 17 in the operating state of the engine 1 after shifted exceeds the given temperature is determined. If the determination result of S8 is YES, the control process proceeds to S13 (see FIG. 14B). On the other hand, if the determination result of S8 is NO, the control process proceeds to S9.

Figure 14A:
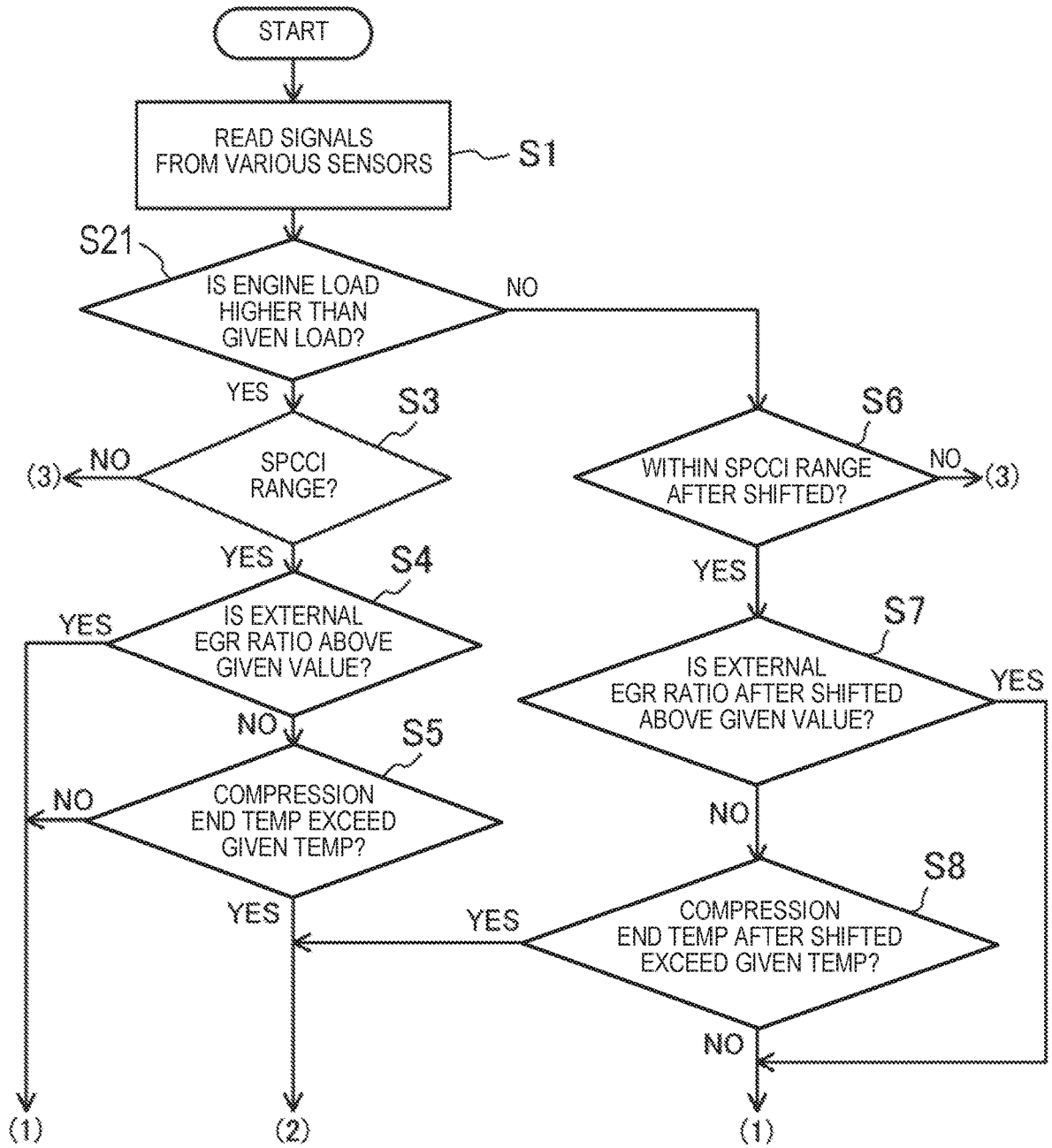
FIG. 14A is a flowchart illustrating a part of a control process of the engine.
Figure 14B:
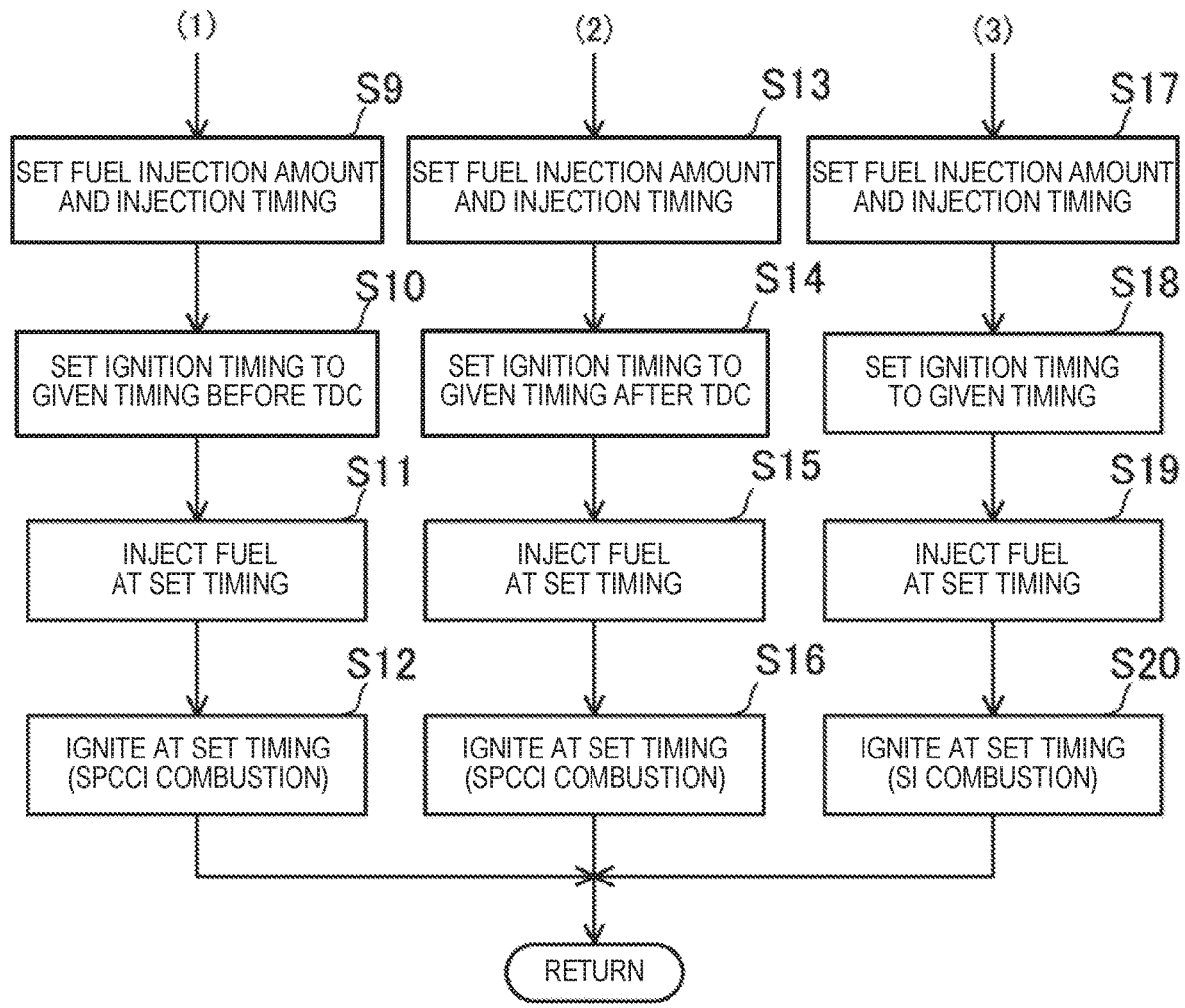
FIG. 14B is a flowchart illustrating another part of the control process of the engine.

At S9 to S12 in the flow of FIG. 14B, since the compression end temperature does not exceed the given temperature or the external EGR gas is sufficiently introduced into the combustion chamber 17, they correspond to the case where combustion noise is prevented from occurring in the SPCCI combustion. First at S9, the ECU 10 sets the fuel injection amount and the fuel injection timing. When the plurality of injections are performed, the injection amount and injection timing of each injection are set. Next at S10, the ECU 10 sets the ignition timing to a given timing before CTDC. Then at S11, the ECU 10 causes the injector 6 to execute the fuel injection according to the injection amount and the injection timing set at S9. Next at S12, the ECU 10 causes the spark plug 25 to perform the ignition according to the timing set at S10. Thus, when the engine 1 is operating in the operation state 603 of the high-load medium-speed range (2), as indicated by the reference character 603 of FIG. 13, the first injection 6031 and the second injection 6032 are performed and the ignition 6033 is performed before CTDC, and the mixture gas causes the SPCCI combustion (see the reference character 6034).

On the other hand, at S13 to S16, since the compression end temperature exceeds the given temperature or the external EGR gas is not sufficiently introduced into the combustion chamber 17, they correspond to the case where combustion noise may increase in the SPCCI combustion. First at S13, the ECU 10 sets the fuel injection amount and the fuel injection timing. When the plurality of injections are performed, the injection amount and injection timing of each injection are set. Next at S14, differently from S10, the ECU 10 sets the ignition timing to a given timing after CTDC. Then at S15, the ECU 10 causes the injector 6 to execute the fuel injection according to the injection amount and the injection timing set at S13. Next at S16, the ECU 10 causes the spark plug 25 to perform the ignition according to the timing set at S14. Thus, when the engine 1 is operating in the operation state 603 of the high-load medium-speed range (2), as indicated by the reference character 603' of FIG. 13, the first injection 6031' and the second injection 6032' are performed and the ignition 6033' is performed after CTDC, and the mixture gas causes the SPCCI combustion (see the reference character 6034'). As a result, the SI combustion in the SPCCI combustion is sufficiently performed and combustion noise of the SPCCI combustion is prevented from occurring.

S17 to S20 correspond to the case where the engine 1 performs the SI combustion. First at S17, the ECU 10 sets the fuel injection amount and the fuel injection timing. When the plurality of injections are performed, the injection amount and injection timing of each injection are set. Next at S18, the ECU 10 sets the ignition timing to the given timing. Within the high-load low-speed range (3), the ignition timing is set to after CTDC. Within the high speed range (4), the ignition timing is set to before CTDC. Then at S19, the ECU 10 causes the injector 6 to execute the fuel injection according to the injection amount and the injection timing set at S17. Next at S20, the ECU 10 causes the spark plug 25 to perform the ignition according to the timing set at S18.

Note that although in the flowcharts illustrated in FIGS. 14A and 14B the ignition timing is adjusted according to the external EGR ratio and the compression end temperature, the ignition timing may be adjusted according to the engine load. For example, within the high-load medium-speed range (2) of the operating range map 501 of FIG. 5, in an operating state 603a where the engine load is low, the compression end temperature is also low as indicated by the one-dotted chain line, and therefore, the ignition timing is set to before CTDC (the reference character 6033) as indicated by the reference character 603a in the upper chart of FIG. 13. On the other hand, in an operating state 603b where the engine load is high, since the compression end temperature is high, the ignition timing is set to after CTDC as indicated by the reference character 603b in the lower chart of FIG. 13 (the reference character 6033'). By retarding the ignition timing, as described above, combustion noise of the SPCCI combustion is prevented from increasing.

Note that the art disclosed here is not limited to be applied to the engine 1 having the above configuration. The configuration of the engine may adopt various configurations.

Figure 15:
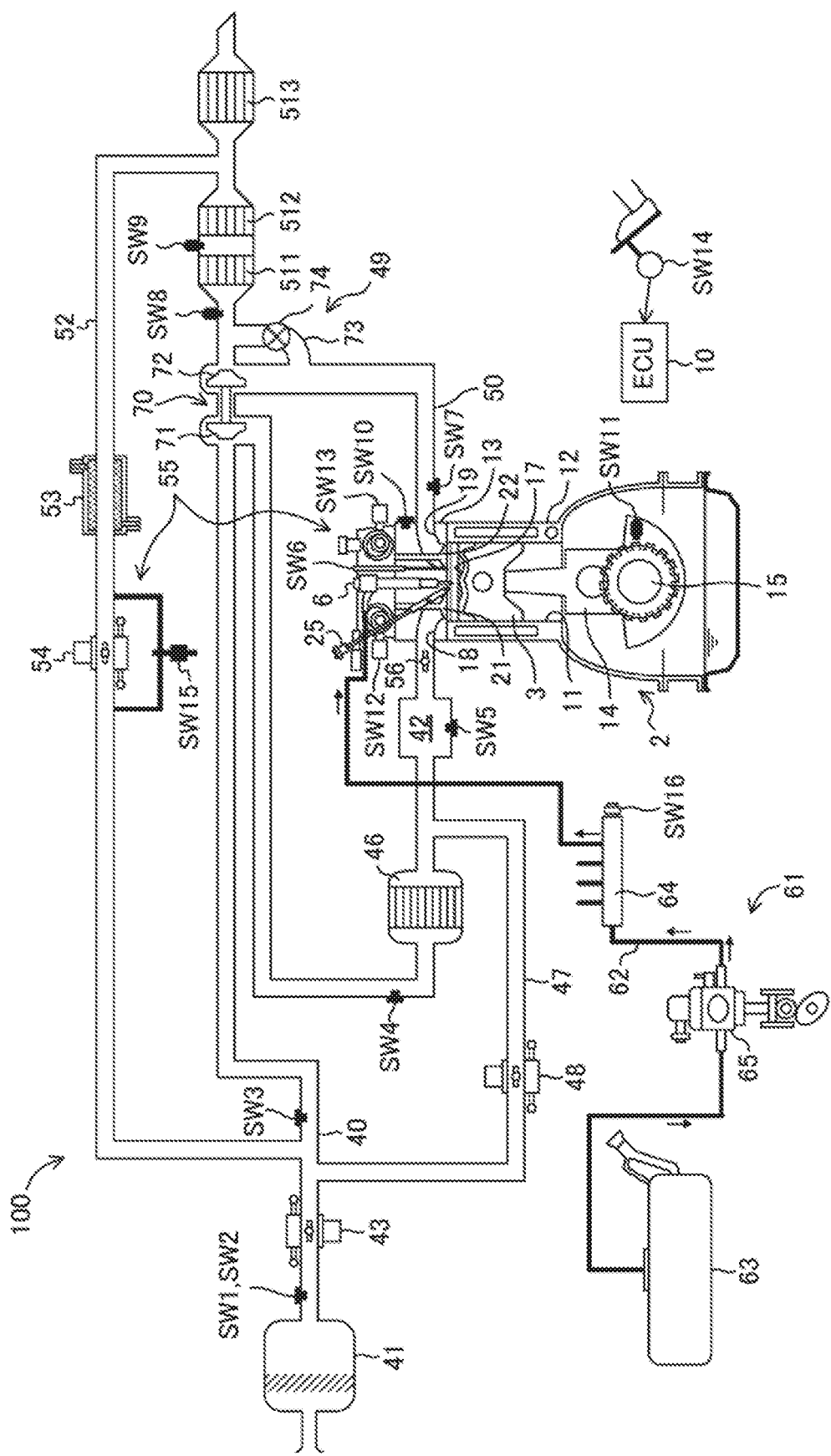
FIG. 15 is a diagram illustrating a configuration of a different engine from FIG. 1.

FIG. 15 illustrates a configuration of an engine 100 according to one modification. The engine 100 includes a turbocharger 70 instead of the booster 44.

The turbocharger 70 includes a compressor 71 disposed in the intake passage 40 and a turbine 72 disposed in the exhaust passage 50. The turbine 72 rotates by exhaust gas flowing in the exhaust passage 50. The compressor 71 rotates by rotational operation of the turbine 72 and turbocharges gas inside the intake passage 40 introduced into the combustion chamber 17.

The exhaust passage 50 is provided with an exhaust bypass passage 73. The exhaust bypass passage 73 connects a part of the exhaust passage 50 upstream of the turbine 72 to a part downstream of the turbine 72 so as to bypass the turbine 72. The exhaust bypass passage 73 is provided with a wastegate valve 74. The wastegate valve 74 adjusts the flow rate of the exhaust gas flowing in the exhaust bypass passage 73.

In this configuration example, the turbocharger 70, the bypass passage 47, the air bypass valve 48, the exhaust bypass passage 73, and the wastegate valve 74 constitute the boosting system 49 in the intake passage 40 and the exhaust passage 50.

In this engine 1, whether to turbocharge the gas to be introduced into the combustion chamber 17 by the turbocharger 70 or not is switchable therebetween by switching the open/closed states of the air bypass valve 48 and the wastegate valve 74.

In the case of not turbocharging the gas to be introduced into the combustion chamber 17, the wastegate valve 74 is opened. Thus, the exhaust gas flowing in the exhaust passage 50 flows to the catalyst converters through the exhaust bypass passage 73, by bypassing the turbine 72, i.e., without passing through the turbine 72. In this manner, the turbine 72 is not affected by the flow of the exhaust gas, and therefore, the turbocharger 70 does not operate. Here, the air bypass valve 48 is fully opened. Thus, the gas flowing through the intake passage 40 flows into the surge tank 42 through the bypass passage 47, without passing through the compressor 71 and the intercooler 46.

In the case of not turbocharging the gas to be introduced into the combustion chamber 17, the wastegate valve 74 is controlled to have an opening narrower than the fully opened state. Thus, the exhaust gas flowing in the exhaust passage 50 at least partially flows into the catalyst converters through the turbine 72. Thus, the turbine 72 rotates by receiving the exhaust gas to operate the turbocharger 70. Once the turbocharger 70 operates, the gas inside the intake passage 40 turbocharges by the rotation of the compressor 71. Here, if the air bypass valve 48 is open, the gas passed through the compressor 71 partially flows back upstream of the compressor 71 through the bypass passage 47. The turbocharging pressure of gas inside the intake passage 40, similarly to the case of using the mechanical booster, is controllable by the adjusting the opening of the air bypass valve 48.

Figure 16:
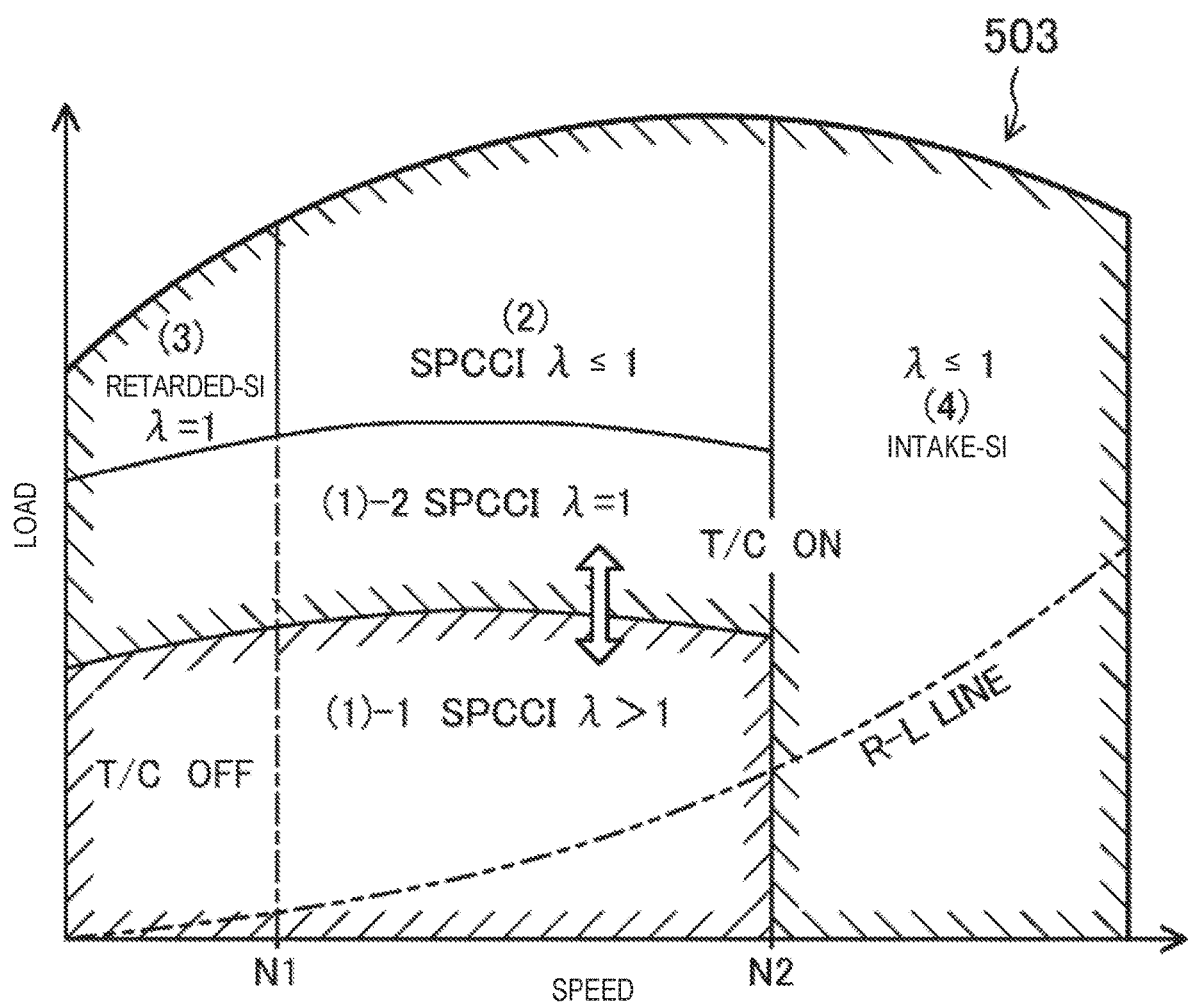
FIG. 16 is a chart illustrating an operating range map of the engine of FIG. 15.

Whether to turbocharge the gas inside the intake passage 40 by the turbocharger 70 or not may, for example, be switched according to a map 503 illustrated in FIG. 16. That is, it may be such that the turbocharging by the turbocharger 70 is not performed within the low speed range (1)-1, while it is performed within the medium load range (1)-2, the high-load medium-speed range (2), the high-load low-speed range (3), and the high speed range (4). Within the low load range (1)-1, since a torque request is low, the necessity for turbocharging is low and the mixture gas is set leaner than the stoichiometric air-fuel ratio. Thus, the temperature of the exhaust gas drops. By opening the wastegate valve 74 to bypass the turbine 72 in order to maintain the three-way catalysts 511 and 513 at their activation temperatures, the heat release by the turbine 72 is avoided and the exhaust gas at a high temperature is supplied to the three-way catalysts 511 and 513.

Also in the engine 100 including the turbocharger 70, the fuel injection amount, the fuel injection timing, and the ignition timing may be set according to the flowchart illustrated in FIGS. 14A and 14B. Further in the engine 100, combustion noise of the SPCCI combustion is prevented when the engine load is high.

Additionally, other than using the intake electrically-operated S-VT 23 which changes the phase of the valve timing of the intake valve 21, the art disclosed here may also be achieved, for example, by using a variable valve mechanism which changes a lift or an opening of the intake valve 21.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1, 100 Engine
2 Engine Body
6 Injector
10 ECU (Control Unit)
17 Combustion Chamber
25 Spark Plug
44 Booster
49 Boosting System
52 EGR Passage (External EGR System)
53 EGR Cooler (External EGR System)
54 EGR Valve (External EGR System)
70 Turbocharger

What is claimed is:

1. A boosted engine, comprising:
an engine body formed with a combustion chamber, the engine body having a geometric compression ratio set between 14:1 and 30:1;
a spark plug disposed in the combustion chamber;
a fuel injection valve disposed to be oriented into the combustion chamber and configured to inject fuel containing at least gasoline;
a booster disposed in an intake passage connected to the combustion chamber;
a boost controller configured to switch a state of the booster between a boosting state where gas introduced into the combustion chamber is boosted and a non-boosting state where the gas is not boosted; and
a control unit connected to the spark plug, the fuel injection valve, and the boost controller and configured to output a control signal to the spark plug, the fuel injection valve, and the boost controller, respectively, wherein
the control unit includes a processor configured to execute:

an operating range determining module to determine an operating range of the engine; and a compression end temperature estimating module to determine whether a temperature of the gas inside the combustion chamber exceeds a given temperature at a top dead center of compression stroke, responsive to the operating range determining module determining that an engine load is in a highest load range higher than a given load and an engine speed is in a first speed range higher than a first given speed and lower than a second given speed, the control signals are outputted to the fuel injection valve and the spark plug so that a mixture gas formed inside the combustion chamber starts SPCCI (SPark Controlled Compression Ignition) combustion through flame propagation by the ignition of the spark plug, and unburned mixture gas inside the combustion chamber then combusts by compression ignition, and the control signal is outputted to the boost controller to bring the booster into the boosting state, responsive to the compression end temperature estimating module estimating that a gas temperature inside the combustion chamber exceeds the given temperature at the top dead center, the control signal is outputted to the fuel injection valve so that an injection end timing of the fuel occurs on the compression stroke, and the control signal is outputted to the spark plug so that the mixture gas inside the combustion chamber is ignited after the top dead center, responsive to the compression end temperature estimating module estimating that the gas temperature inside the combustion chamber does not exceed the given temperature at the top dead center, the control signal is outputted to the spark plug so that the mixture gas inside the combustion chamber is ignited before the top dead center, and wherein the first speed range is a medium speed range and a second speed range higher than the second given speed is a high speed range when an entire operating range of the engine is divided into a low speed range, the medium speed range, and the high speed range.

2. The engine of claim 1, wherein the engine has an exhaust gas recirculation (EGR) passage connecting an exhaust passage to the intake passage, the intake passage and the exhaust passage being connected to the combustion chamber, the EGR passage provided with an EGR valve configured to adjust a flow rate of EGR gas flowing inside the EGR passage in response to receiving a control signal from the control unit, and responsive to the operating range determining module determining that the engine load is in the highest load range, the control unit outputs the control signal to the EGR valve so that the EGR gas is recirculated to the intake passage.

3. The engine of claim 2, wherein the EGR passage connects a downstream side of a catalyst device disposed in the exhaust passage to an upstream side of the booster of the intake passage, and responsive to the operating range determining module determining that the engine load is in the highest load range, the control unit outputs the control signal to the EGR valve so that a ratio of an EGR gas mass with respect to an entire gas mass inside the combustion chamber becomes 20% or above.

4. The engine of claim 2, wherein the EGR passage is provided with an EGR cooler configured to cool the EGR gas.

5. The engine of claim 1, wherein responsive to the operating range determining module determining that the engine load is in the highest load range, the engine body sets an effective compression ratio to 80% or above of the geometric compression ratio.

6. The engine of claim 5, wherein the engine body includes an intake valve close timing adjusting mechanism configured to adjust a close timing of an intake valve, and responsive to the operating range determining module determining that the engine load is in the highest load range, the control unit outputs a control signal to the intake valve close timing adjusting mechanism to set the close timing of the intake valve in which the effective compression ratio becomes 80% or above of the geometric compression ratio.

7. The engine of claim 1, wherein a bypass passage communicating an upstream side of the booster to a downstream side thereof to bypass the booster is provided in the intake passage, the bypass passage provided with a bypass valve configured to adjust the flow rate of the gas flowing through the bypass passage, a boost controlling module outputs a control signal to the bypass valve to close so as to enter the boosting state of the gas to be introduced into the combustion chamber, and the boost controlling module outputs the control signal to the bypass valve to open so as to enter the non-boosting state of the gas to be introduced into the combustion chamber.

* * * * *